United States Patent
Kim et al.

(10) Patent No.: US 9,581,824 B2
(45) Date of Patent: Feb. 28, 2017

(54) THREE-DIMENSIONAL (3D) DISPLAY DEVICE

(71) Applicant: SAMSUNG DISPLAY CO., LTD., Yongin, Gyeonggi-Do (KR)

(72) Inventors: Il-Joo Kim, Hwaseong-si (KR); Jinoh Song, Seoul (KR); Hyungwoo Yim, Goyang-si (KR); Yoonkyung Park, Seoul (KR); Seung Jun Jeong, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 292 days.

(21) Appl. No.: 14/473,304

(22) Filed: Aug. 29, 2014

(65) Prior Publication Data

US 2015/0253579 A1  Sep. 10, 2015

(30) Foreign Application Priority Data

Mar. 6, 2014 (KR) ........................ 10-2014-0026711

(51) Int. Cl.
*G02F 1/1335* (2006.01)
*G02B 27/22* (2006.01)
*H04N 13/04* (2006.01)

(52) U.S. Cl.
CPC ..... *G02B 27/2214* (2013.01); *H04N 13/0404* (2013.01); *H04N 13/0415* (2013.01); *H04N 13/0456* (2013.01)

(58) Field of Classification Search
CPC ................................................ G02B 27/2214
USPC .......................................................... 349/15
See application file for complete search history.

(56) References Cited

U.S. PATENT DOCUMENTS

| | | | |
|---|---|---|---|
| 8,120,647 B2 | 2/2012 | Soh | |
| 2005/0057702 A1 | 3/2005 | Cho et al. | |
| 2007/0120768 A1 | 5/2007 | Lee et al. | |
| 2011/0157497 A1 | 6/2011 | Kim | |
| 2012/0069063 A1 | 3/2012 | Sato et al. | |
| 2012/0194510 A1* | 8/2012 | Yun ......................... | G02B 3/06 345/419 |
| 2013/0063691 A1 | 3/2013 | Takama et al. | |

FOREIGN PATENT DOCUMENTS

| | | |
|---|---|---|
| KR | 1020110104701 | 9/2011 |
| KR | 1020120017308 | 2/2012 |
| KR | 1020120028171 | 3/2012 |
| KR | 1020120067623 | 6/2012 |
| KR | 1020120077451 | 7/2012 |
| KR | 1020120087647 | 8/2012 |

* cited by examiner

*Primary Examiner* — Thanh-Nhan P Nguyen
(74) *Attorney, Agent, or Firm* — F. Chau & Associates, LLC

(57) ABSTRACT

A 3D display device is provided. The 3D display device includes a display panel and a liquid crystal lens panel. The display panel operates in one of a 2D mode for displaying a 2D image, a 3D mode for displaying a 3D image, and a coincident mode for displaying the 2D image and the 3D image. The liquid crystal lens panel is disposed on the display panel. The liquid crystal lens panel is configured to refract the 3D image through a third region of the liquid crystal lens panel and to transmit the 2D image without refracting the 2D image when the display panel operates in the coincident mode.

11 Claims, 21 Drawing Sheets

FIG. 7
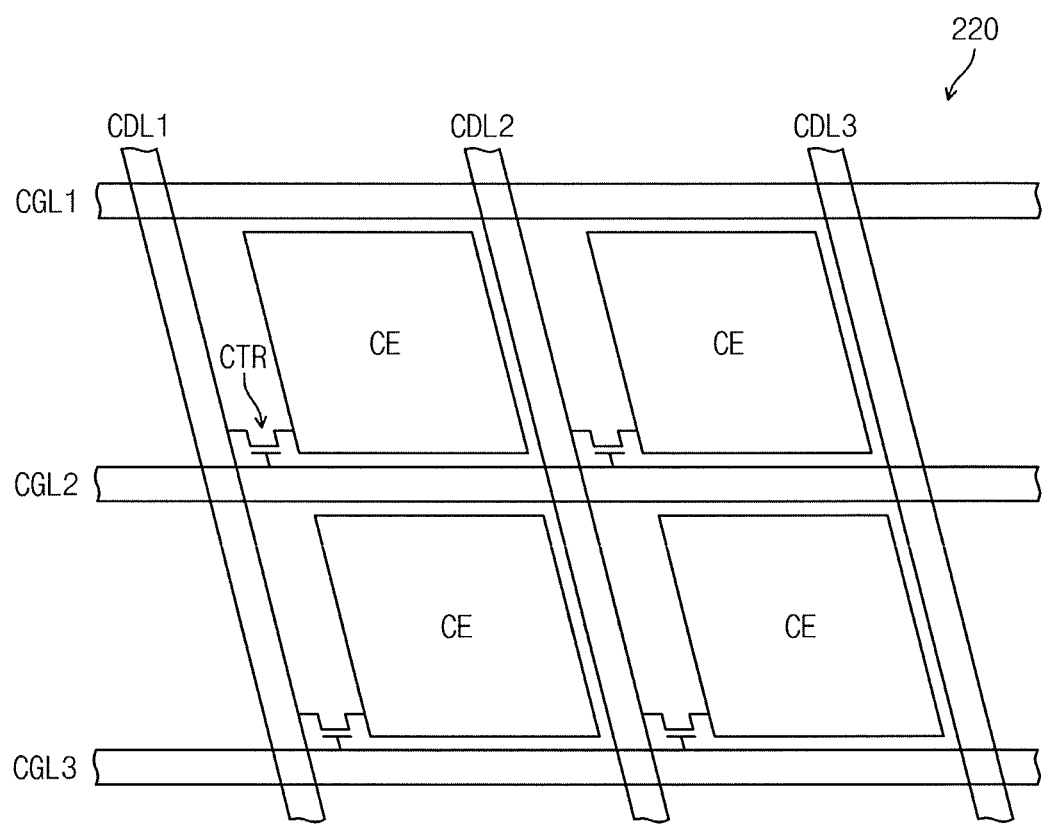
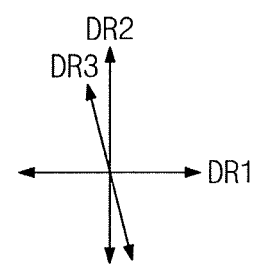

FIG. 11
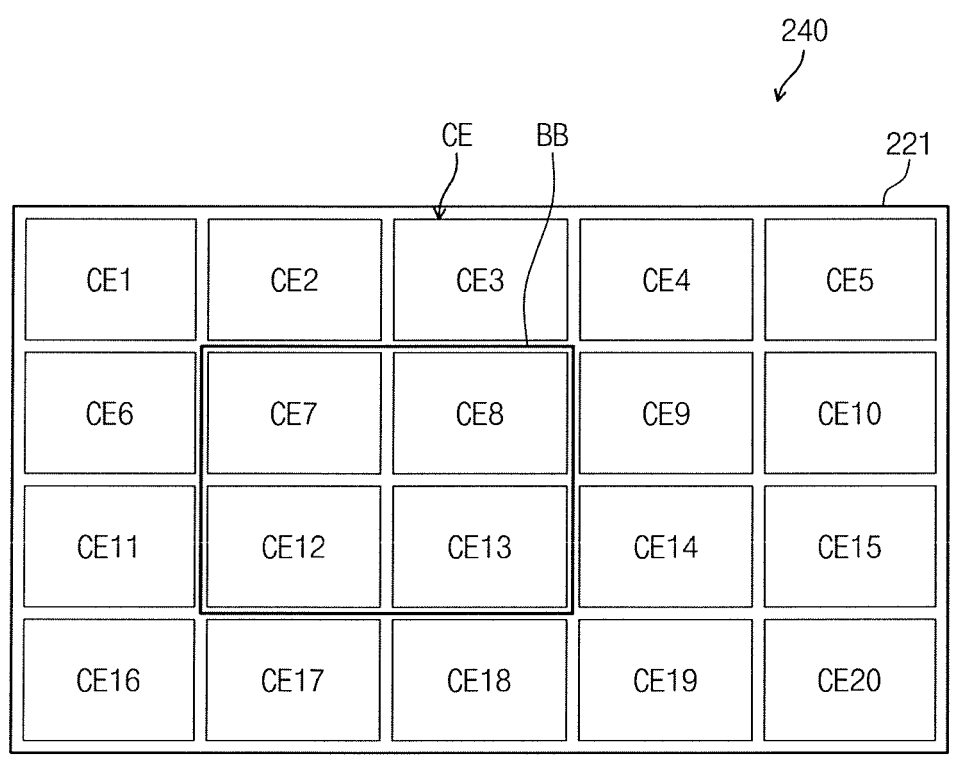
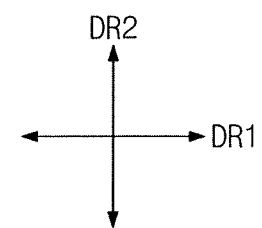

FIG. 13
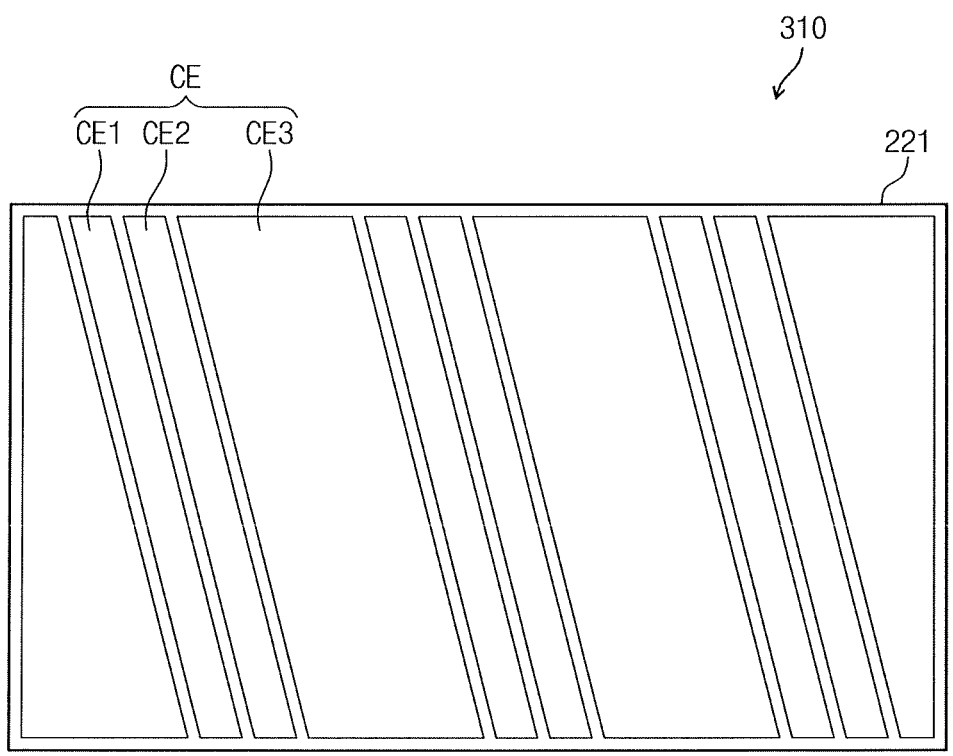
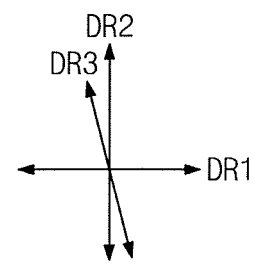

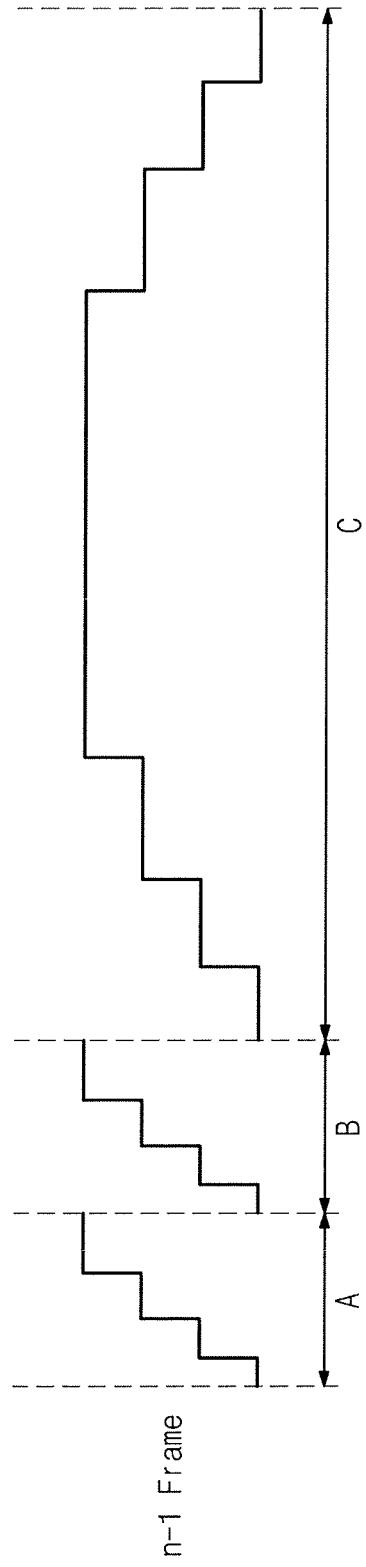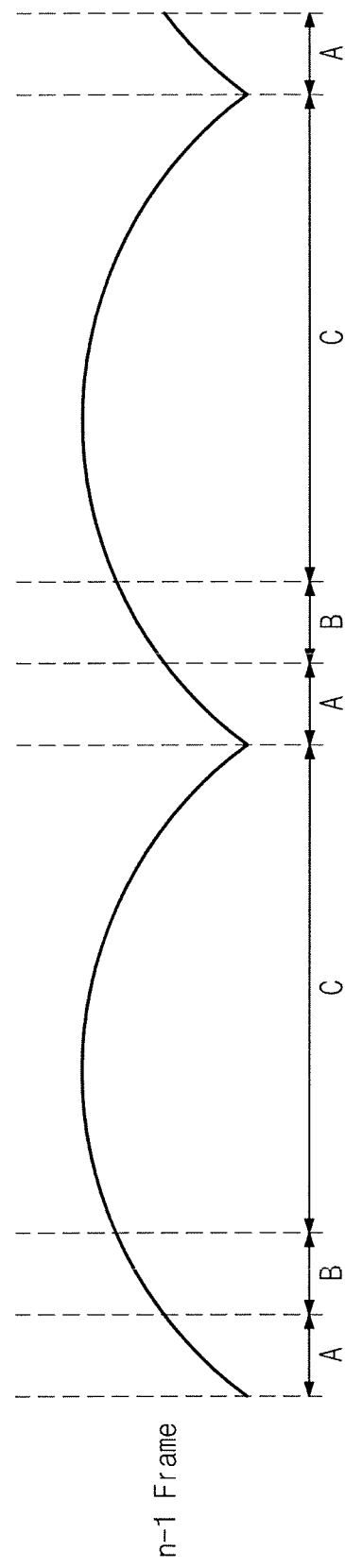

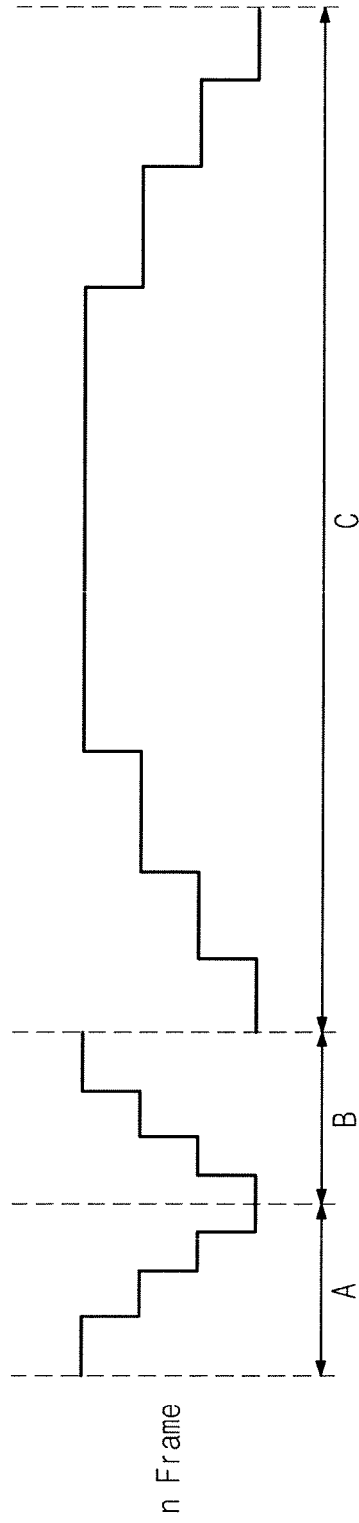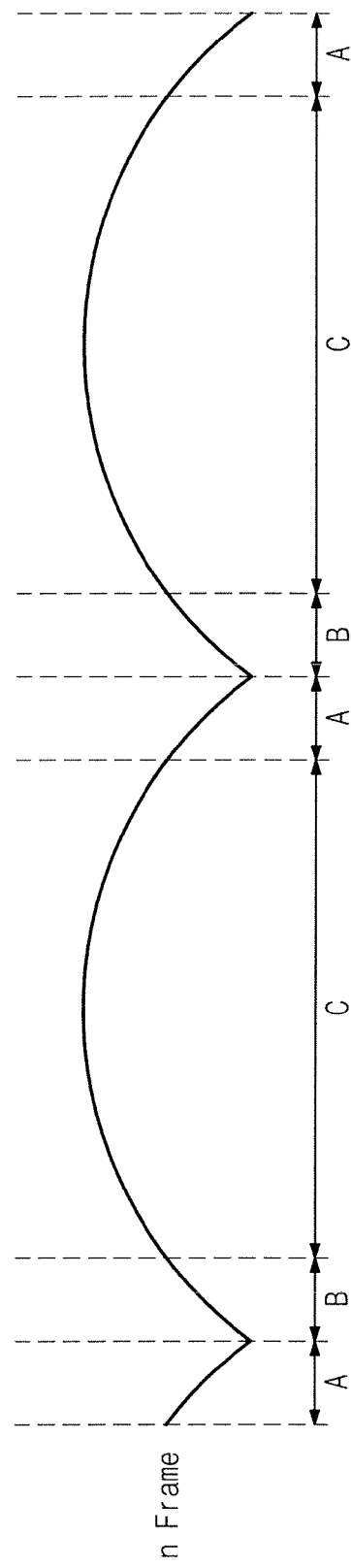

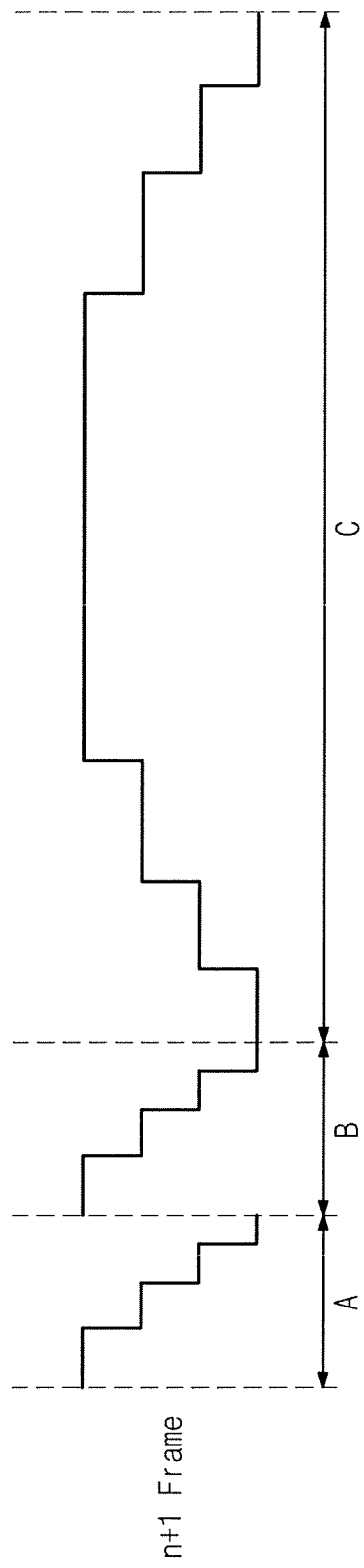
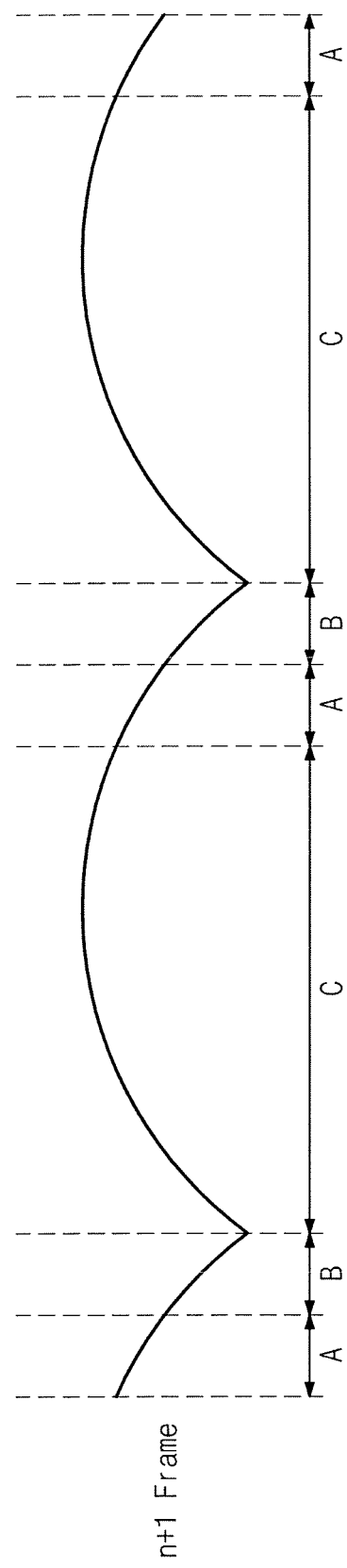

FIG. 20
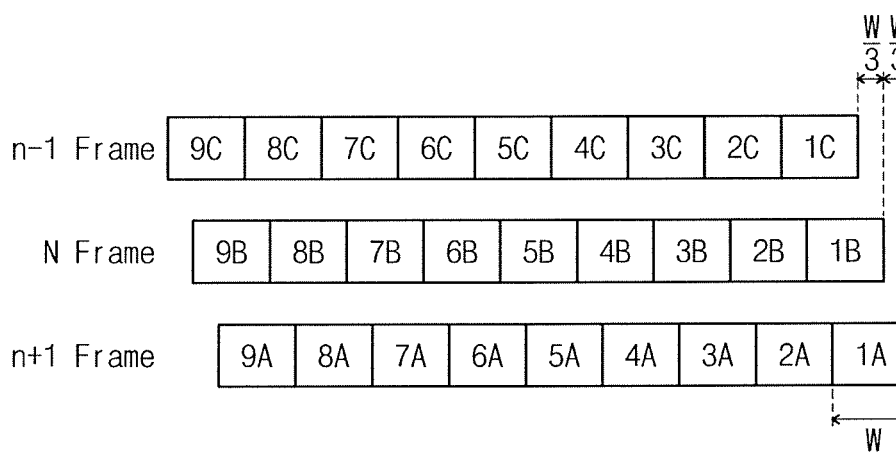
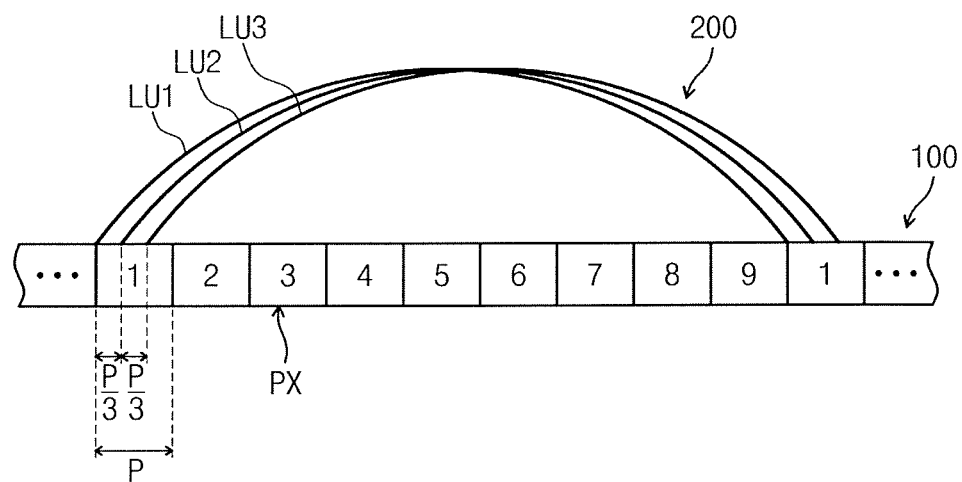

THREE-DIMENSIONAL (3D) DISPLAY DEVICE

CROSS-REFERENCE TO RELATED APPLICATION

This application claims priority under 35 U.S.C. §119 to Korean Patent Application No. 10-2014-0026711, filed on Mar. 6, 2014, in the Korean Intellectual Property Office, the disclosure of which is incorporated by reference herein in its entirety.

TECHNICAL FIELD

The present inventive concept relates to a three-dimensional (3D) display device, and more particularly to a 3D display device for providing 3D images in a glassless mode.

DISCUSSION OF THE RELATED ART

Three-dimensional (3D) display devices display 3D images by using stereoscopic or autostereoscopic techniques.

Stereoscopic techniques may employ glasses and no glassless. The glass technique uses a patterned retarder to change polarizing directions of left and right-eye images or to display the left and right-eye images in particular time intervals, thereby providing 3D images to a viewer.

The glassless technique uses a barrier panel or a liquid crystal lens panel to separate optical axes of the left and right-eye images. Thus, a 3D display device using such a liquid crystal lens panel may control an operating mode of the liquid crystal lens panel and to respectively provide the left and right images to the left and right eyes of a viewer.

SUMMARY

According to an exemplary embodiment of the present inventive concept, a three-dimensional (3D) display device is provided. The 3D display device includes a display panel and a liquid crystal lens panel. The display panel operates in one of a two-dimensional (2D) mode for displaying a 2D image, a 3D mode for displaying a 3D image, and a coincident mode for displaying the 2D image in a first region of the display panel and the 3D image in a second region of the display panel. The liquid crystal lens panel is disposed on the display panel. The liquid crystal lens panel is configured to refract the 3D image through a third region of the liquid crystal lens panel and to transmit the 2D image without refracting the 2D image when the display panel operates in the coincident mode.

The liquid crystal lens panel includes a first substrate, a second substrate, and a liquid crystal layer. The first substrate includes a plurality of lens electrodes. The second substrate is opposite to the first substrate. The second substrate includes a plurality of common electrodes isolated from each other and arranged in a matrix. The liquid crystal layer is disposed between the first substrate and the second substrate. The plurality of common electrodes includes on-common electrodes and off-common electrodes. The on-common electrodes are disposed on the third region and receive an on-drive voltage. The off-common electrodes are not disposed on the third region and receive an off-drive voltage different from the on-drive voltage.

In an exemplary embodiment of the present inventive concept, the liquid crystal layer may be changed in phase when offset voltages between the lens electrodes and the common electrodes are lower than a saturation voltage. The liquid crystal layer may not be changed in phase when offset voltages between the lens electrodes and the common electrodes are equal to or higher than the saturation voltage.

In an exemplary embodiment of the present inventive concept, offset voltages between the off-drive voltage and voltages applied to the lens electrodes may by higher than or equal to a saturation voltage. Offset voltages between the on-drive voltage and the voltages applied to the lens electrodes may be lower than the saturation voltage.

In an exemplary embodiment of the present inventive concept, the liquid crystal lens panel may further include a plurality of lens unit fields functioning as a Fresnel lens. Widths of the lens electrodes may be narrower as positions of the lens electrodes become farther from the center of the lens unit fields.

In an exemplary embodiment of the present inventive concept, the liquid crystal lens panel may be shaped in a tetragon having one side extending along a first direction and another side extending along a second direction orthogonal to the first direction.

In an exemplary embodiment of the present inventive concept, the lens electrodes may be isolated from each other along the first direction and each lens electrode may be shaped extending along a third direction intersecting the first and second directions.

In an exemplary embodiment of the present inventive concept, the common electrodes may be isolated from each other in the first and second directions.

In an exemplary embodiment of the present inventive concept, each common electrode may be shaped in a tetragon having one side extending along the first direction and another side extending along the second direction.

In an exemplary embodiment of the present inventive concept, each common electrode may be shaped in a tetragon having one side extending along the first direction and another side extending along the third direction.

In an exemplary embodiment of the present inventive concept, the second substrate may further include common gate lines and common data lines. The common gate lines may extend along the first direction. The common data lines may be isolated from the common gate lines and may extend along the third direction. The common electrodes may be configured in an area surrounded by the common gate lines and the common data lines.

In an exemplary embodiment of the present inventive concept, the second substrate may further include a common thin film transistor connected to a corresponding one of the common gate lines, a corresponding one of the common data lines, and a corresponding one of the common electrodes. The common thin film transistor may be configured to supply one of the on-drive and off-drive voltages to the corresponding one of the common data lines, to the corresponding one of the common electrodes in response to a scan signal applied to the corresponding one of the common gate lines.

According to an exemplary embodiment of the present inventive concept, a three-dimensional (3D) display device is provided. The 3D display device includes a display panel and a liquid crystal lens panel. The display panel extends along a first direction and a second direction substantially orthogonal to the first direction, and includes a plurality of pixels. The liquid crystal lens panel is disposed on the display panel and has a focusing point shifted for every frame. The liquid crystal lens panel includes a first lens unit field, a first substrate, a second substrate, and a liquid crystal layer. The first lens unit field includes first, second, and third lens regions, which are adjacent to each other. The first lens unit field has a Fresnel lens function. The first substrate includes a plurality of lens electrodes. The second substrate is opposite to the bottom substrate and includes a plurality of common electrodes. The liquid crystal layer is disposed between the first and second substrates. Absolute voltage values applied to each of the plurality of lens electrodes are constant for every frame.

In an exemplary embodiment of the present inventive concept, the first lens unit field may include the first, second, and third lens regions adjacent to each other along the first direction. The common electrodes may include a first common electrode corresponding to the first lens region, a second common electrode corresponding to the second lens region, and a third common electrode corresponding to the third lens region.

In an exemplary embodiment of the present inventive concept, voltages applied to the common electrodes may be repeated every frame period that includes a plurality of frames.

In an exemplary embodiment of the present inventive concept, the frame period may include three through i-th frames (i is a natural number), and a focusing point of the first lens unit field may be shifted by 1/i of one pixel for every frame along the first direction.

In an exemplary embodiment of the present inventive concept, the frame period may include first, second, and third frames which are adjacent to each other. During the first frame, the first, second, and third lens regions may be arranged in order in the first lens unit field. During the second frame, the second, third, and first lens regions may be arranged in order in the first lens unit field. During the third frame, the third, first and second lens regions may be arranged in order in the first lens unit field.

In an exemplary embodiment of the present inventive concept, an absolute voltage value applied to the first common electrode during the first frame may be different from an absolute voltage value applied to the first common electrode during the second frame.

In an exemplary embodiment of the present inventive concept, the first lens unit field may include a first row lens unit field and a second row lens unit field which are adjacent to each other along the second direction. The first common electrode may include a first row first common electrode corresponding to the first row lens unit field and a second row first common electrode corresponding to the second row lens unit field. The second common electrode may include a first row second common electrode corresponding to the first row lens unit field and a second row second common electrode corresponding to the second row lens unit field.

In an exemplary embodiment of the present inventive concept, the first row lens unit field and the second row lens unit field may have different focusing points in the same frame.

In an exemplary embodiment of the present inventive concept, the liquid crystal lens panel may further include a common line connected to the common electrodes. The common line may include a first common line and a second common line. The first common line may extend along the first direction and may be configured to supply a voltage to the first common electrode. The second common line may be isolated from the first common line in the second direction, may extend along the first direction, and may be configured to supply a voltage to the second common electrode.

In an exemplary embodiment of the present inventive concept, each of the first and second common lines may receive a voltage from the first substrate.

According to an exemplary embodiment of the present inventive concept, a three-dimensional (3D) display device is provided. The 3D display device includes a display panel and a liquid crystal lens panel. The liquid crystal lens panel is disposed on the display panel and has a focusing point shifted for every frame. The liquid crystal lens panel includes a first lens unit field, a first substrate, a second substrate, and a liquid crystal layer. The first lens unit includes first, second, and third lens regions. The first substrate includes a plurality of lens electrodes. The second substrate is opposite to the first substrate. The second substrate includes a plurality of common electrodes. The liquid crystal layer is disposed between the first and second substrates. Absolute voltage values applied to each of the plurality of lens electrodes are constant for every frame, and absolute voltage values applied to one of the plurality of common electrodes are different in two adjacent frames.

BRIEF DESCRIPTION OF THE FIGURES

The above and other features of the present inventive concept will be more apparent from the following description with reference to the accompanying figures, in which:

FIG. 7 is a plan view illustrating a portion of a top plate of FIG. 5 according to an exemplary embodiment of the present inventive concept;

FIG. 11 is a plan view illustrating a top substrate of a liquid crystal lens panel according to an exemplary embodiment of the present inventive concept;

FIG. 13 is a plan view illustrating a top substrate of the liquid crystal lens panel of FIG. 12 according to an exemplary embodiment of the present inventive concept;

FIGS. 17A, 18A and 19A show distribution profiles of refractive indices in the first through third lens regions, respectively during n−1st, nth and n+1st frames according to an exemplary embodiment of the present inventive concept;

FIGS. 17B, 18B and 19B show distribution profiles of refractive indices in a lens unit field formed of the first through third lens regions, respectively during the n−1st, nth, and n+1st frames according to an exemplary embodiment of the present inventive concept;

FIG. 20 is a view illustrating images recognized by sight at the n−1st, nth, and n+1st frames according to an exemplary embodiment of the present inventive concept;

DETAILED DESCRIPTION OF THE EMBODIMENTS

Figure 1:
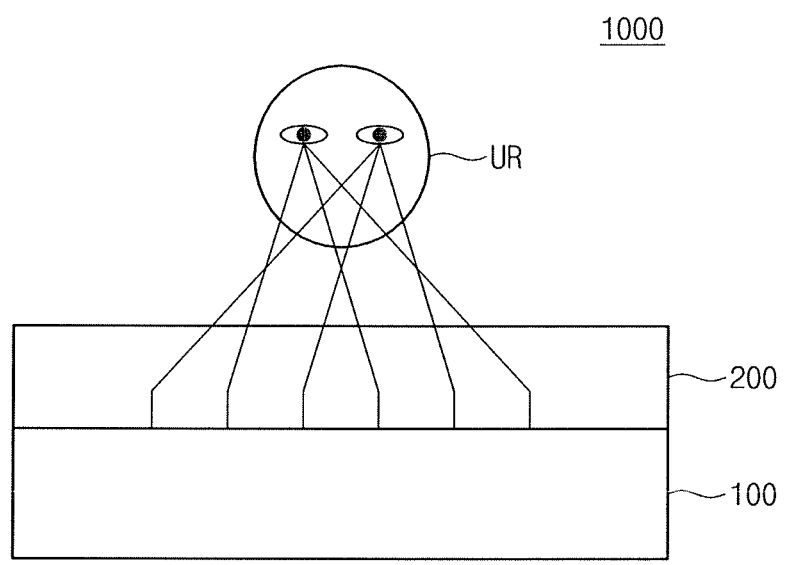
FIG. 1 illustrates a configuration of a three-dimensional (3D) display device, according to an exemplary embodiment of the present inventive concept, and a process in which a 3D image is recognized by a user.

Exemplary embodiments of the present inventive concept will be described more fully hereinafter with reference to the accompanying drawings. The present inventive concept may, however, be embodied in various different forms and should not be construed as being limited to the embodiments set forth herein. Like reference numerals may denote like elements throughout the specification and drawings. In the drawings, the sizes or thicknesses of layers, panels, regions, etc., may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

Figure 2:
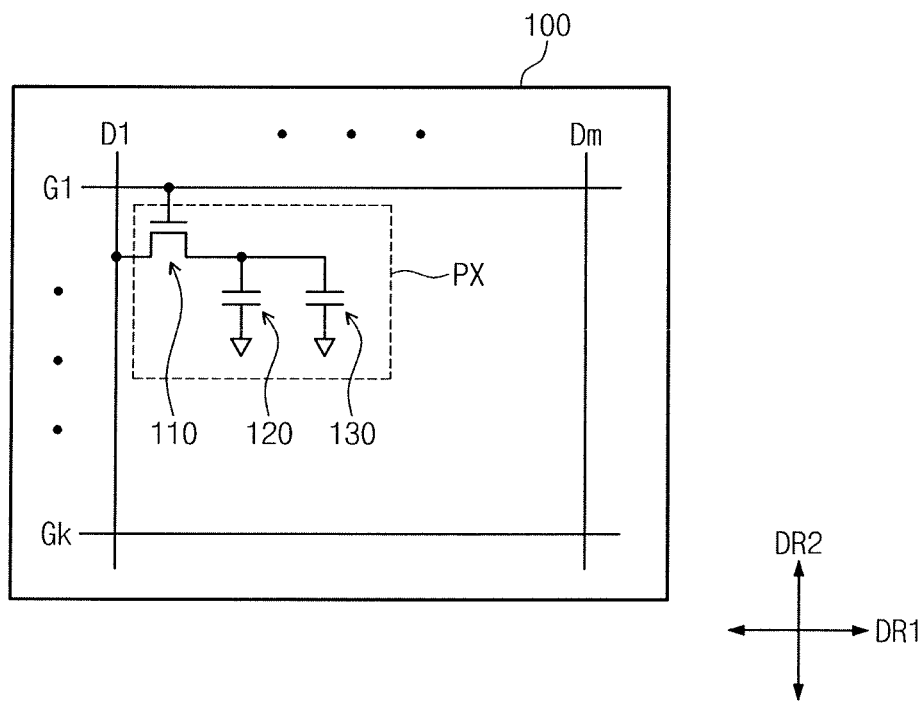
FIG. 2 is a plan view illustrating a display panel in FIG. 1 according to an exemplary embodiment of the present inventive concept.

FIG. 1 illustrates a configuration of a three-dimensional (3D) display device, according to an exemplary embodiment of the inventive concept, and how a 3D image is recognized by a user, and FIG. 2 is a plan view illustrating a display panel shown in FIG. 1 according to an exemplary embodiment of the present inventive concept.

Referring to FIGS. 1 and 2, the 3D display device 1000 may include a display panel 100 and a liquid crystal lens panel 200.

The display panel 100 operates in one of a two-dimensional (2D) mode, a 3D mode, and a coincident mode according to a signal input by a user's selection. The display panel 100 operates to display a 2D image in the 2D mode, a 3D image in the 3D mode, and the 2D and 3D images in the coincident mode where, for example, the 2D and 3D images are displayed simultaneously. The 2D image is recognized as a plane image to a user UR. The 3D image is recognized as a stereoscopic image to the user UR. FIG. 1 shows an example where the user UR recognizes a stereoscopic image.

The display panel 100 is not restrictive to a specific form. For example, the display panel 100 may be a liquid crystal display panel, an electrophoretic display panel, an electrowetting display panel, or the like.

Hereinafter, a liquid display panel including a liquid display layer sandwiched between a pair of substrates will be described. Although not shown, a display device equipped with this liquid crystal display panel may further include a pair of polarizing plates on opposite sides.

The display panel 100 may be shaped in a tetragon having one side extending to a first direction DR1, and the other side extending to a second direction DR2 which is substantially orthogonal to the first direction DR1.

The display panel 100 includes a plurality of gate lines G1~Gk for receiving gate signals, and a plurality of data lines D1~Dm for receiving data voltages. The gate lines G1~Gk intersect the data lines D1~Dm and are electrically insulated from the data lines D1~Dm. The gate lines G1~Gk may be elongated along the first direction DR1 and the data lines D1~Dm may be elongated along the second direction DR2. The display panel 100 includes a plurality of pixel areas arranged in a matrix and each pixel area includes a pixel. Referring to FIG. 2, an equivalent circuit model for a pixel PX of the pixels is illustrated as an example. The pixel PX includes a thin film transistor 110, a liquid crystal capacitor 120, and a storage capacitor 130.

The thin film transistor 110 may include a gate electrode, a source electrode, and a drain electrode. The gate electrode is electrically connected to the first one G1 among the gate lines G1~Gk. The source electrode is electrically connected to the first one D1 among the data lines D1~Dm. The drain electrode is electrically connected to the liquid crystal capacitor 120 and the storage capacitor 130. The liquid crystal capacitor 120 and the storage capacitor 130 are electrically connected to the drain electrode in parallel.

The display panel 100 may include a first display substrate, a second display substrate, and a liquid crystal display layer interposed between the first and second display substrates.

In the first display substrate are formed the gate lines G1~Gk, the data lines D1~Dm, the thin film transistor 110, and a first electrode (not shown) of the liquid crystal capacitor 120. The thin film transistor 110 applies a data voltage to the first electrode in response to a gate signal.

In the second display substrate is formed a second electrode (not shown) of the liquid crystal capacitor 120, where a reference voltage is applied to the second electrode. The liquid crystal display layer acts as a dielectric body between the first and second electrodes. The liquid crystal capacitor 120 is charged with a voltage corresponding to a gap in voltage between the data voltage applied to the first electrode and the reference voltage applied to the second electrode.

The liquid crystal lens panel 200 may be disposed on the display panel 100. For example, the liquid crystal lens panel 200 may be disposed on the top of the display panel 100. The liquid crystal lens panel 200 may be turned off when the display panel 100 operates in the 2D mode. The liquid crystal lens panel 200 may be turned on when the display panel 100 operates in the 3D mode. In addition, the liquid crystal lens panel 200 may be partly turned on and off when the display panel 100 operates in the coincident mode. When the liquid crystal lens panel 200 is turned on, a 3D image may be refracted and displayed on the display panel 100, and thus, the user UR may recognize the 3D image.

The 3D display device 1000 may further include a backlight unit (not shown) for supplying light to the display panel 100. The backlight unit is disposed under the display panel 100.

Figure 3:
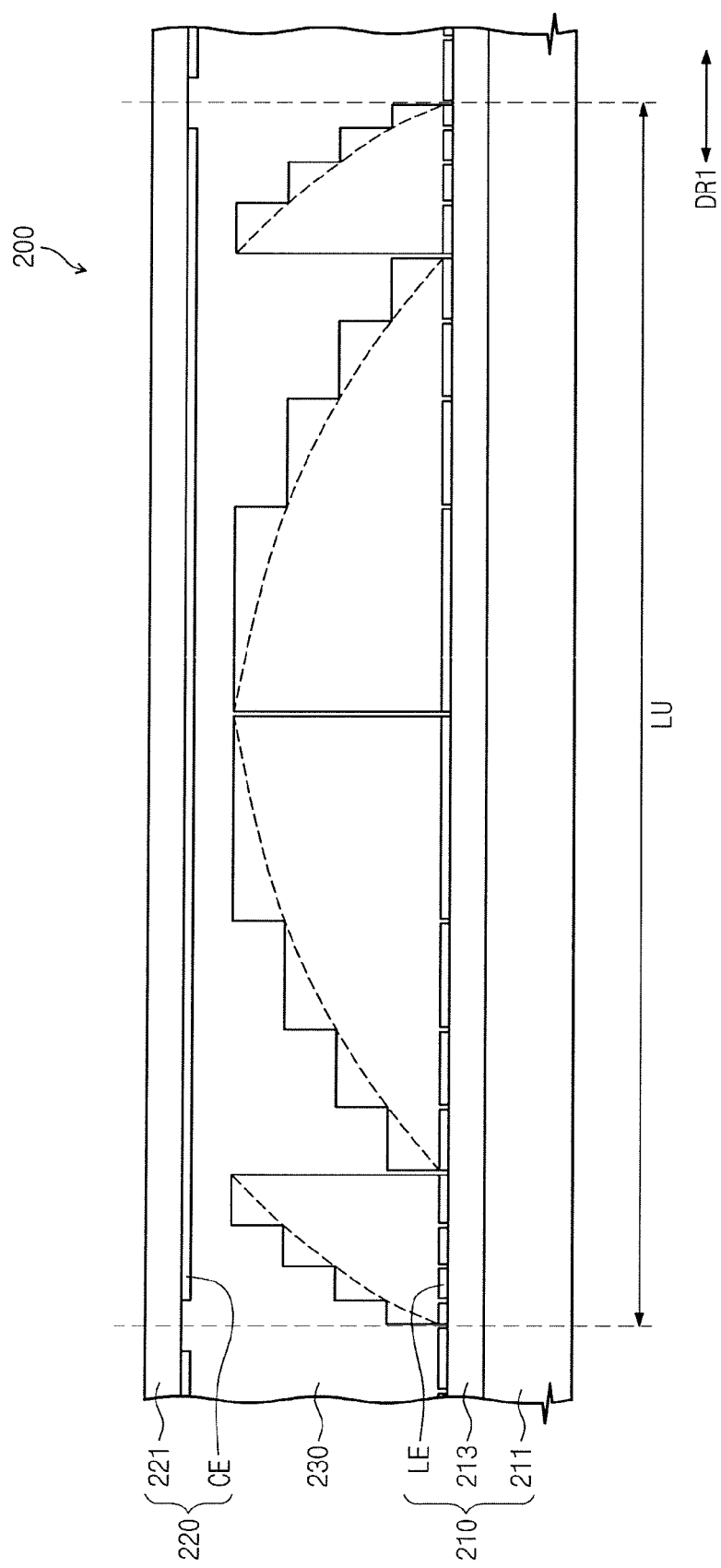
FIG. 3 is a sectional view illustrating a liquid crystal lens panel of FIG. 1 according to an exemplary embodiment of the present inventive concept.
Figure 4:
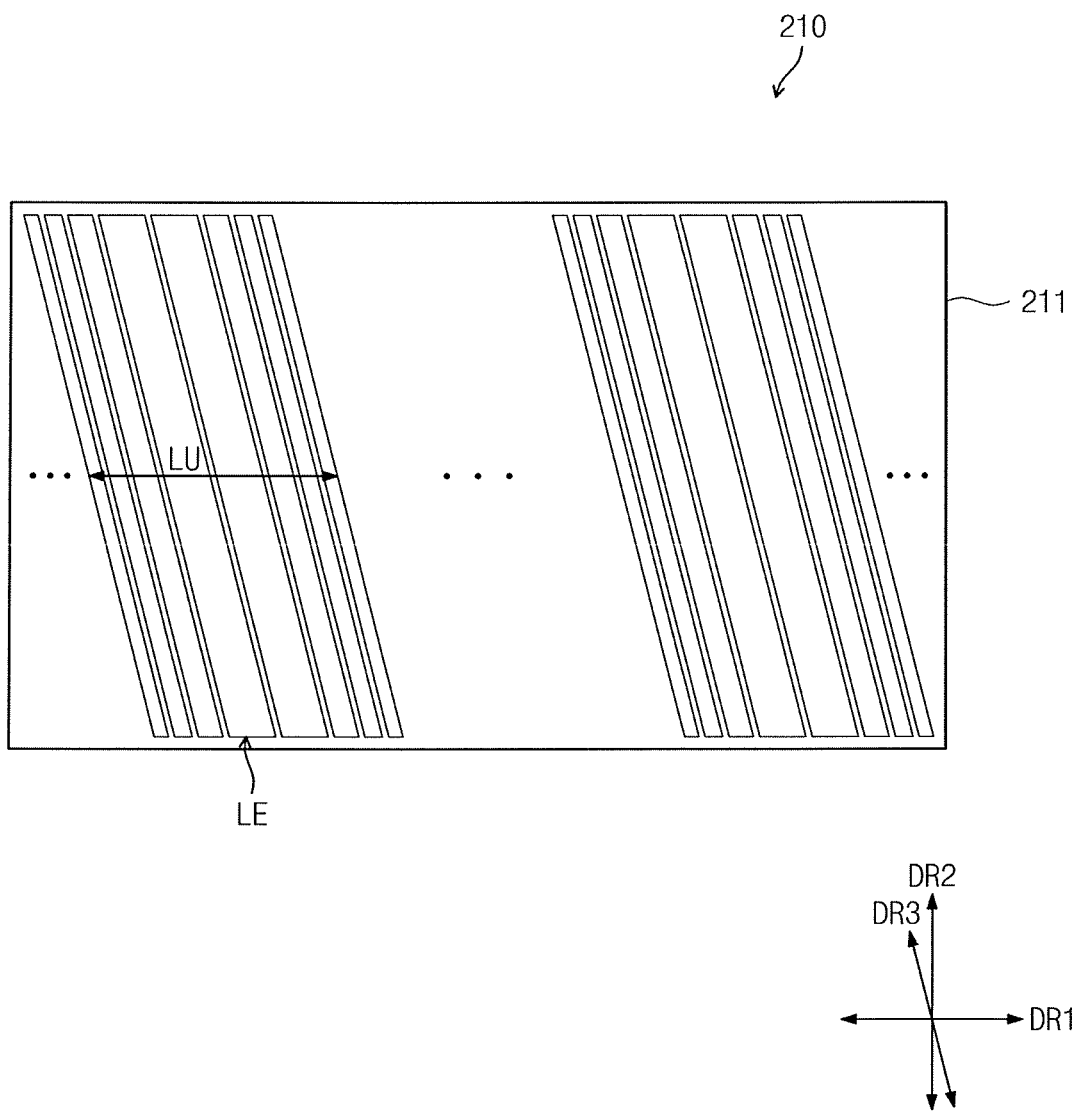
FIG. 4 is a plan view illustrating a bottom substrate of the liquid crystal lens panel of FIG. 3 according to an exemplary embodiment of the present inventive concept.
Figure 5:
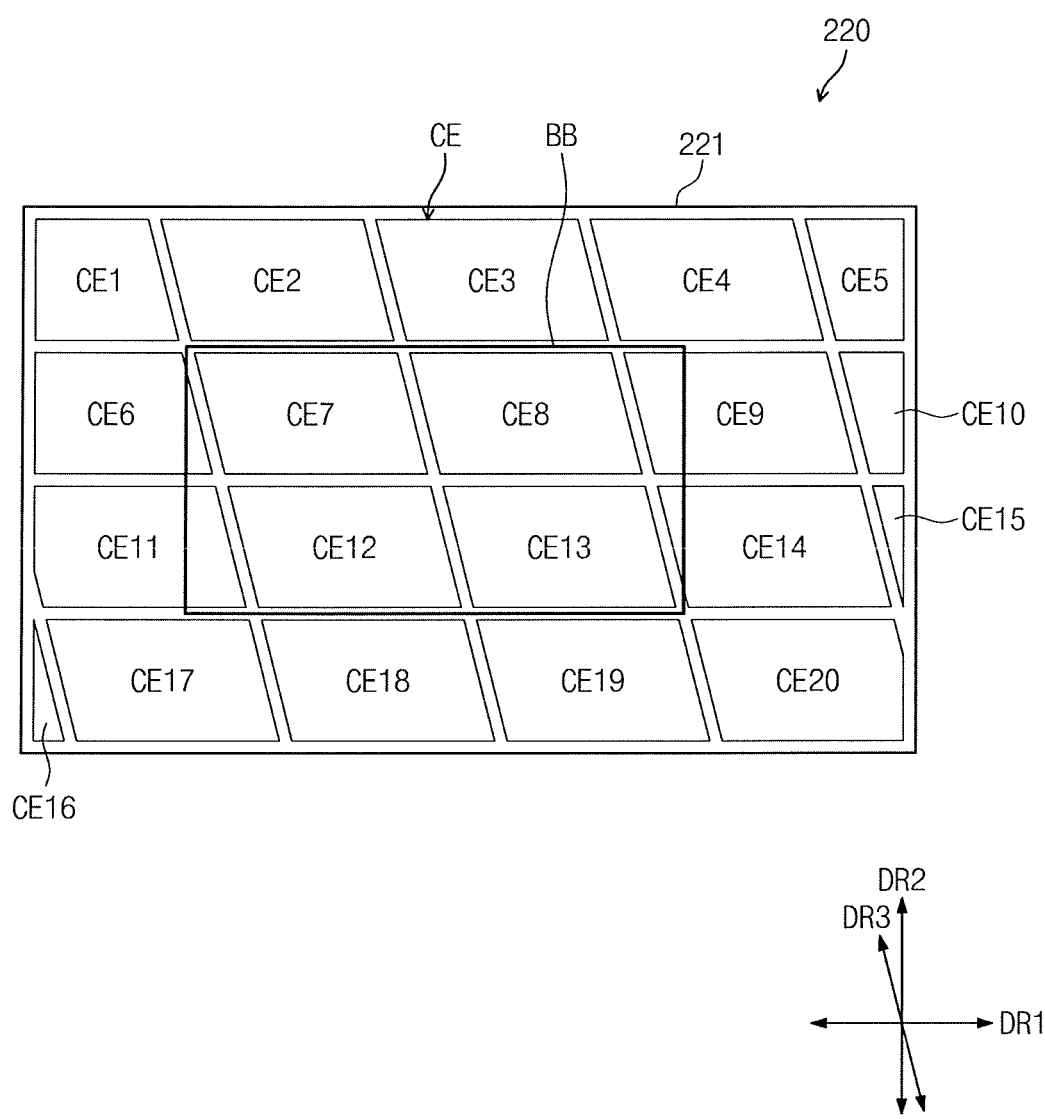
FIG. 5 is a plan view illustrating a top substrate of the liquid crystal lens panel of FIG. 3 according to an exemplary embodiment of the present inventive concept.

FIG. 3 is a sectional view illustrating the liquid crystal lens panel 100 of FIG. 1 according to an exemplary embodiment of the present inventive concept, FIG. 4 is a plan view illustrating a bottom substrate of the liquid crystal lens panel 200 of FIG. 3 according to an exemplary embodiment of the present inventive concept, and FIG. 5 is a plan view illustrating a top substrate of the liquid crystal lens panel 200 of FIG. 3 according to an exemplary embodiment of the present inventive concept.

Referring to FIGS. 3 through 5, the liquid crystal lens panel 200 may be formed in a tetragon which has one side extending along the first direction DR1, and the other side extending along the second direction DR2.

The liquid crystal lens panel 200 includes a bottom substrate 210, a top substrate 220, and a liquid crystal layer 230.

The bottom substrate 210 may include a first base substrate 211, a first insulation film 213, and lens electrodes LE.

The first base substrate 211 may be an insulation substrate.

The first insulation substrate 213 is placed on the first base substrate 211. The insulation film 213 may prevent a parasitic capacitances from being generated between electrodes attached to a display panel (not shown) placed under the first base substrate 211 and the lens electrodes LE, or between the electrodes and a common electrode CE.

The lens electrodes LE are formed on the first insulation film 213. The lens electrodes LE may be provided in plural and isolated from each other. Each lens electrode LE may be shaped in an elongated form along a third direction DR3. The third direction DR3 may intersect the first direction DR1 and the second direction DR2.

Although FIG. 3 illustrates that the lens electrodes LE are formed in a single layer, an exemplary embodiment of the present inventive concept is not restricted thereto. For example, the lens electrodes LE may be formed in a plurality of layers. For example, when the lens electrodes LE are in two layers, the lens electrodes LE may include lower lens electrodes (not shown) and upper lens electrodes (not shown). In addition, a second insulation film may be formed between the lower and upper lens electrodes. The lower and upper lens electrodes may be alternately disposed along the first direction DR1.

The top substrate 220 is disposed to be opposite to the bottom substrate 210. The top substrate 220 may include a second base substrate 221 and common electrodes CE.

The second base substrate 221 may be an insulation substrate.

The common electrodes CE are disposed to be opposite to the lens electrodes LE with the liquid crystal layer 230 disposed therebetween. The common electrodes CE may be arranged in a matrix. The common electrodes CE may be isolated from each other in the first direction DR1 and the second direction DR2. FIG. 5 illustrates twenty common electrodes CE1~CE20 as an example. Each common electrode CE may be shaped in a tetragon having one side extending to the first direction DR1, and the other side extending to the third direction DR3.

The liquid crystal layer 230 is interposed between the bottom substrate 210 and the top substrate 220 and contains liquid crystal molecules. The liquid crystal layer 230 acts as a lens by changing an orientation of the liquid crystal molecules in accordance with an electric field formed between the lens electrodes LE and the common electrodes CE.

The liquid lens panel 200 may include a plurality of lens unit fields LU. The lens unit field LU may be a unit area arranged to make the liquid crystal layer 230 act as a Fresnel lens in accordance with an electric field formed by a voltage applied to the lens electrodes LE and the common electrodes CE.

Widths of the lens electrodes LE in the first direction DR1 may become narrower as the lens electrodes LE are positioned further from the center of the lens unit field LU. The lens electrodes LE are different in width to allow the liquid crystal layer to have a Fresnel lens refractive index distribution (see, e.g., the dotted line in the liquid crystal layer 230 of FIG. 3).

Referring to FIG. 3, the Fresnel lens refractive index distribution (e.g., see the dotted line in the liquid crystal layer 230) is shown in the lens unit field LU. For example, differences in voltage (e.g., offset voltages) between the lens electrodes LE and the common electrodes CE change in 4 steps as the refractive index distributions change.

Although not shown, between the liquid crystal layer 230 and the lens electrodes LE, and/or between the liquid crystal layer 230 and the common electrodes CE, an alignment film may be formed to create an initial alignment.

Figure 6:
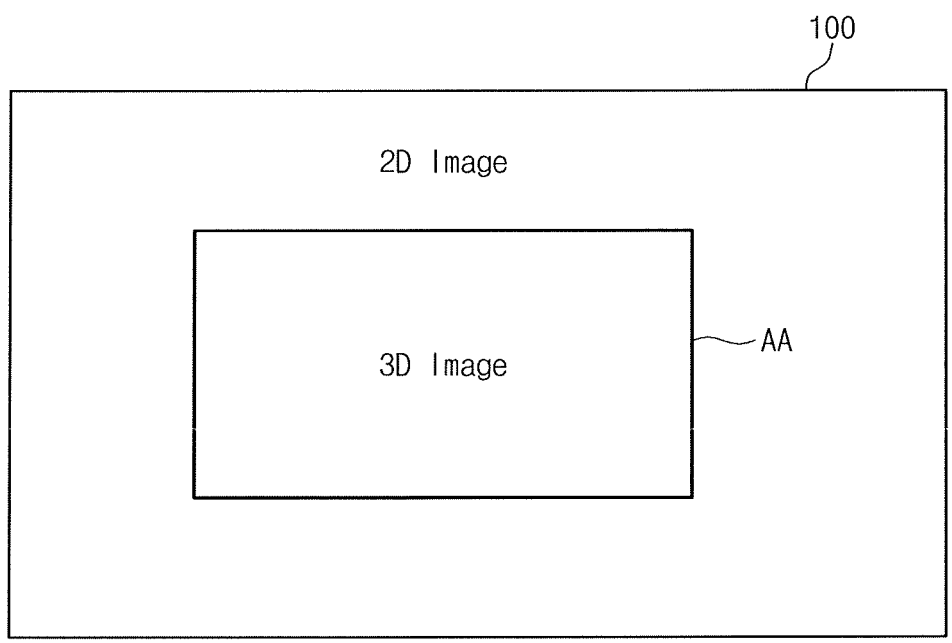
FIG. 6 illustrates a display panel operating in a coincident mode according to an exemplary embodiment of the present inventive concept.

FIG. 6 illustrates a display panel 100 operating in a coincident mode according to an exemplary embodiment of the present inventive concept.

Referring to FIG. 6, the display panel 100 coincidently displays 2D and 3D images. For example, the 3D image is displayed in a first partial region AA of the display panel 100 and the 2D image is displayed in the rest of the display panel 100. The rest of the display panel 100 may refer to regions other than the first partial region AA.

Referring to FIGS. 5 and 6, the 3D image displayed in the first partial region AA may be refracted through a second partial region BB in the top substrate 220 of FIG. 5, and thus, its stereoscopic view may be provided to the user. In addition, the 2D image displayed in the rest of the display panel 100 may be transmitted intact, such that it is not refracted through the liquid crystal lens panel 200.

For example, on-common electrodes CE7, CE8, CE12, and CE13 that overlap the second partial region BB may receive an on-drive voltage. In addition, off-common electrodes CE1, CE2, CE3, CE4, CE5, CE6, CE9, CE10, CE11, CE14, CE15, CE16, CE17, CE18, CE19, and CE20 may receive an off-drive voltage. However, an exemplary embodiment of the present inventive concept is not limited thereto. For example, the common electrodes CE6, CE9, CE11, and CE14 that partly overlap the second partial region BB as well as the common electrodes CE7, CE8, CE12, and CE13 that fully overlap the second partial region BB may receive the on-drive voltage when the rest of the common electrodes CE1, CE2, CE3, CE4, CE5, CE10, CE15, CE16, CE17, CE18, CE19, and CE19 may receive the off-drive voltage.

The on-common electrodes CE7, CE8, CE12, and CE13 are activated to allow the second partial region BB of the liquid crystal lens panel 200 to refract a 3D image which is displayed in the first partial region AA, thereby providing its stereoscopic view to a user. The off-common electrodes CE1, CE2, CE3, CE4, CE5, CE6, CE9, CE10, CE11, CE14, CE16, CE17, CE18, CE19, and CE20 may be inactivated to make a user recognize a 2D image at sight without refracting the 2D image, which is displayed in the rest of the first partial region AA, through the rest of the second partial region BB of the liquid crystal lens panel 200.

Figure 8:
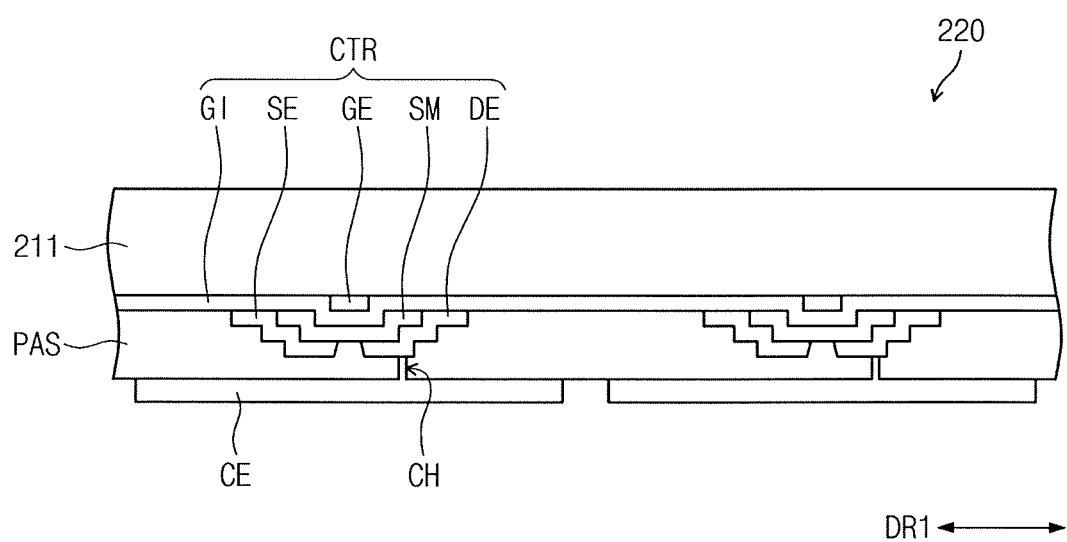
FIG. 8 is a sectional view illustrating a common electrode and a common thin film transistor of FIG. 7 according to an exemplary embodiment of the present inventive concept.

FIG. 7 is a plan view illustrating a portion of a top plate 220 of FIG. 5 according to an exemplary embodiment of the present inventive concept, and FIG. 8 is a sectional view illustrating a common electrode and a common thin film transistor of FIG. 7 according to an exemplary embodiment of the present inventive concept. FIG. 7 shows 4 adjacent common electrodes and their peripheral areas and FIG. 8 shows 2 adjacent common electrodes and the common thin film transistors.

Referring to FIGS. 7 and 8, the top substrate 220 may further include common gate lines CGL1~CGL3, common data lines CDL1~CDL3, and the common thin film transistors CTR.

The common gate lines CGL1~CGL3 and the common data lines CDL1~CDK3 may intersect each other and may be isolated from each other.

The common gate lines CGL1~CGL3 may extend along the first direction DR1 and the common data lines CDL1~CDL3 may extend along the third direction DR3. The common electrodes CE may be formed respectively in areas confined by the common gate lines CGL1~CGL3 and the common data lines CDL1~CDL3.

Referring to FIG. 8, each of the common thin film transistors CTR includes a common gate electrode GE, a common source electrode SE, and a common drain electrode DE. The common gate electrode GE is connected to the common data lines CDL1~CDL3, the common source electrode SE is connected to the common data lines CDL1~CDL3, and the common drain electrode DE is connected to the common electrodes CE.

The common gate electrode GE may be placed on the second base substrate 211. A gate insulation film GT may be formed on the common gate electrode GE. In addition, a semiconductor pattern SM overlaying the common gate electrode GE may be formed on the gate insulation film GI. The common source electrode SE may be connected to one end of the semiconductor pattern SM. The common drain electrode DE may be electrically isolated from the common source electrode SE, and connected to the other end of the semiconductor pattern SM. In addition, a passivation film PAS may be formed on the common source electrode SE and the common drain electrode DE. The passivation film PAS may include a contact hole CH overlaid with the common electrode CE and the common drain electrode DE. The common drain electrode DE may be connected to the common electrode CE through the contact hole CH.

The common gate lines CGL1~CGL3 may be supplied with a scan signal in sequence. The common data lines CDL1~CDL3 may be applied with the on-drive voltage and the off-drive voltage. The common thin film transistor CTR may apply one of the on-drive and off-drive voltages to the common electrodes CE in response to the scan signal. The common electrodes CE may alternatively receive the on-drive voltage or the off-drive voltage by using active elements such as the common thin film transistor CTR.

Figure 9:
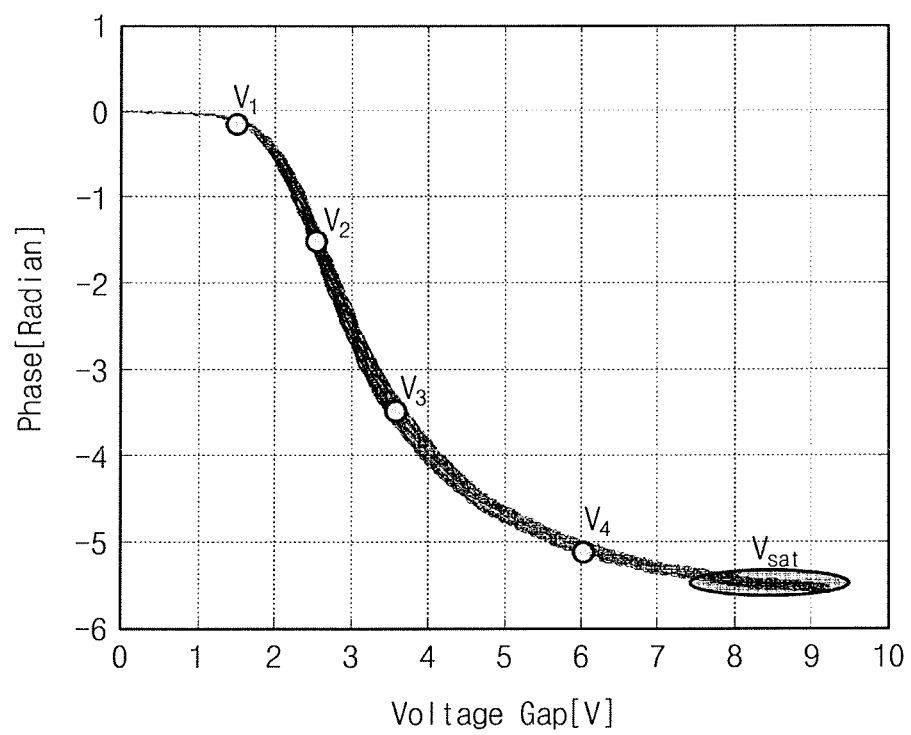
FIG. 9 is a graph illustrating phases of liquid crystal molecules depending on offset voltages on the liquid crystal lens panel of FIG. 3 according to an exemplary embodiment of the present inventive concept.
Figure 10:
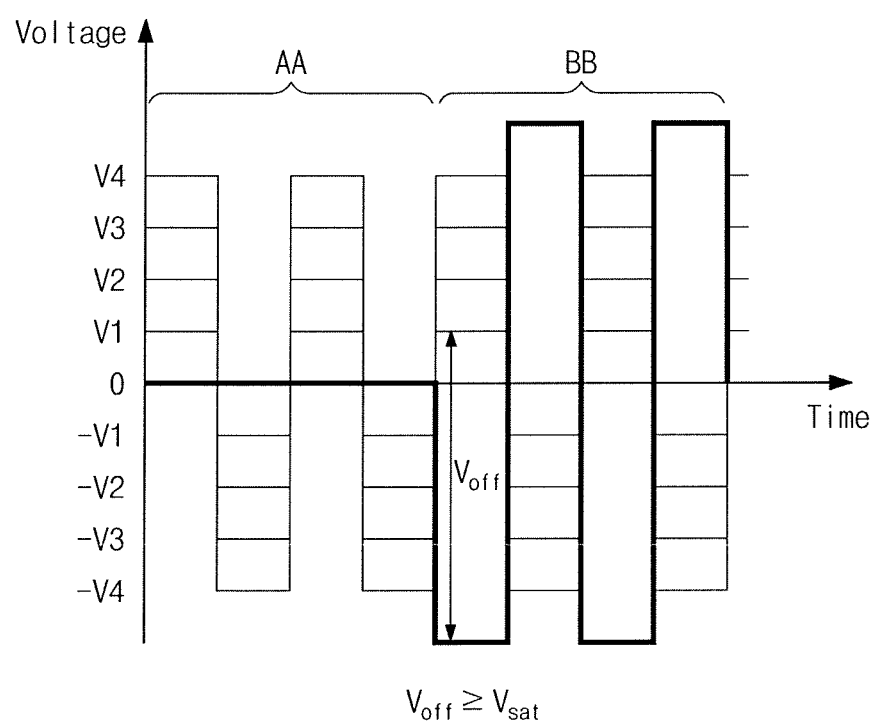
FIG. 10 shows on-drive and off-drive voltages according to an exemplary embodiment of the present inventive concept.

FIG. 9 is a graph illustrating phases of liquid crystal molecules depending on offset voltages on the liquid crystal lens panel 200 of FIG. 3 according to an exemplary embodiment of the present inventive concept and FIG. 10 shows the on-drive and off-drive voltages according to an exemplary embodiment of the present inventive concept.

Referring to FIGS. 3 and 9, phases of liquid crystal molecules of the liquid crystal layer 230 are reduced as differences in voltage (e.g., offset voltages) between the lens electrodes LE and the common electrodes CE are increased. In addition, when the differences in voltage between the lens electrodes LE and the common electrodes CE are greater than or equal to a saturation voltage Vsat, the phases of the liquid crystal molecules may not be further changed. For example, the phases of the liquid crystal molecules of the liquid crystal layer 230 may be changed in a non-linear form.

Referring back to FIG. 9, first through fourth voltages V1~V4 are shown as an example and thus, phases of the liquid crystal molecules may be changed in 4 steps which correspond to the first through fourth voltages V1~V4, respectively. However, an exemplary embodiment of the present inventive concept is not limited thereto. For example, the phase change of the liquid crystal molecules may be divided into 5 steps or more by setting 5 or more different voltages.

Referring to FIGS. 3, 6, 9, and 10, the first through fourth voltages V1~V4 and their inverse voltages −V1~−V4 may be applied to the lens electrodes LE. The on-drive voltage may be applied to the on-common electrodes and the off-drive voltage may be applied to the off-common electrodes. In FIG. 10, the on-drive voltage may be 0 V and the off-drive voltage may be at a level where an absolute value of an offset voltage Voff between the off-drive voltage and the first through fourth voltages V1~V4 is higher than or equal to the saturation voltage Vsat.

For example, in the first partial region AA, the offset voltage Voff between the lens electrodes LE and the on-common electrodes may correspond to one of the first through fourth voltages V1~V4 and thus, phases of the liquid crystal molecules may be changed. In the second partial region BB, as the offset voltages Voff between the lens electrodes LE and the-off common electrodes become higher than the saturation voltage Vsat, the phase of the liquid crystal molecules may be maintained at the minimum to transmit incident light without refraction. Therefore, when an image of a quantity of one screen is displayed, a user may recognize 3D and 2D images through the first partial region AA and the second partial region BB, respectively.

FIG. 11 is a plan view illustrating a top substrate of a liquid crystal lens panel according to an exemplary embodiment of the present inventive concept.

Referring to FIG. 11, the common electrodes CE may have various patterns. The common electrodes CE may be provided in plural and, be isolated from each other. The common electrodes CE may be arranged in a matrix. The common electrodes CE may be isolated from each other along the first direction DR1 and the second direction DR2. Each common electrode CE may be shaped in a tetragon having one side extending to the first direction DR1 and the other side extending to the second direction DR2.

Figure 12:
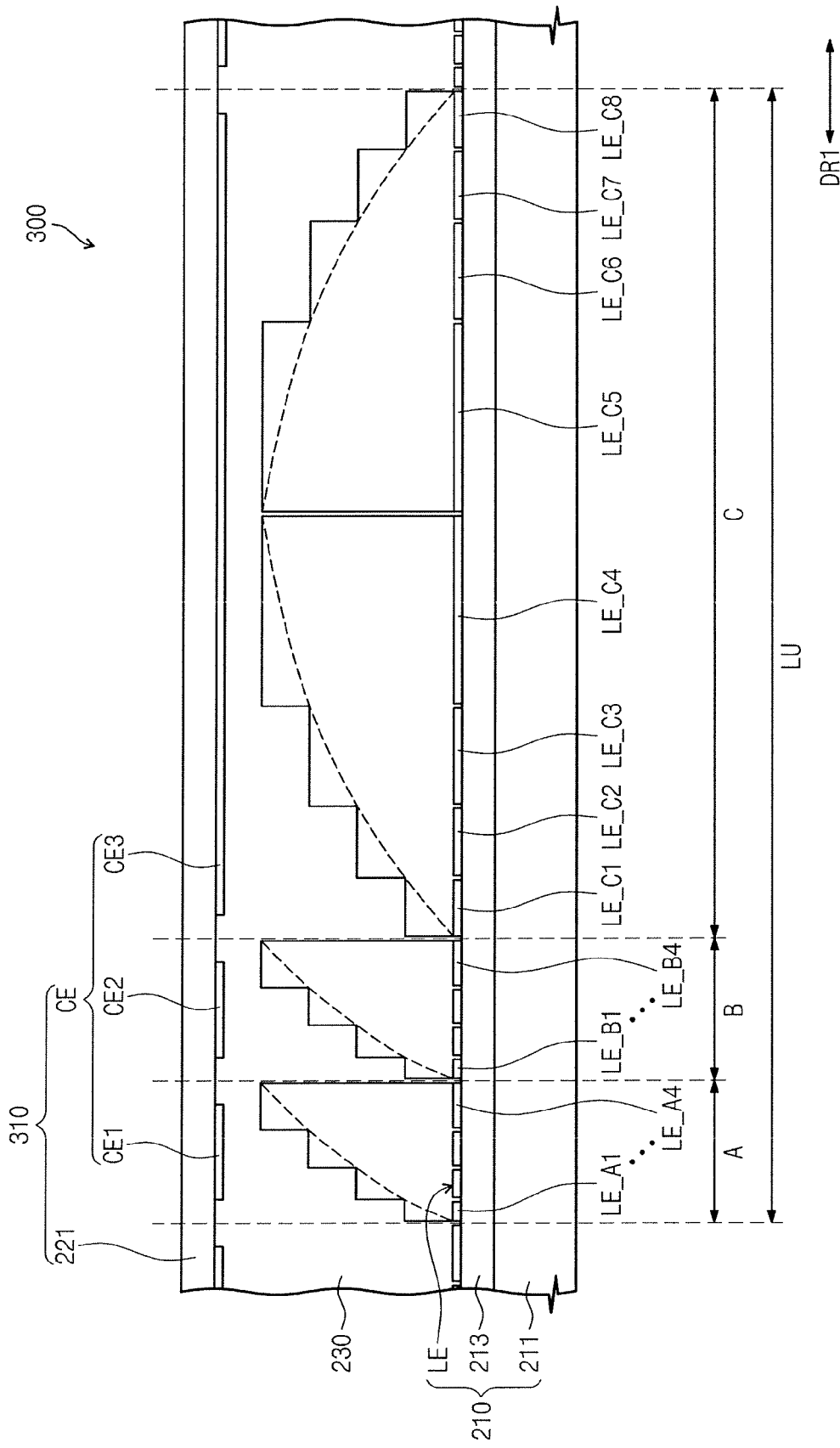
FIG. 12 is a sectional view illustrating a liquid crystal lens panel according to an exemplary embodiment of the present inventive concept.

FIG. 12 is a sectional view illustrating a liquid crystal lens panel 300 according to an exemplary embodiment of the present inventive concept, and FIG. 13 is a plan view illustrating a top substrate 310 of the liquid crystal lens panel 300 of FIG. 12 according to an exemplary embodiment of the present inventive concept.

Hereinafter, the liquid crystal lens panel 300 of FIG. 12 will be described by comparing the liquid crystal lens panel 300 with the liquid crystal lens panel 200 described with reference to FIGS. 3 through 5, giving emphasis to the difference between the liquid crystal lens panel 300 and the liquid crystal lens panel 200. The elements not explained in FIG. 12 may correspond to those of FIGS. 3 through 5.

Each lens unit field LU of the liquid crystal lens panel 200 may include a first lens region A, a second lens region B, and a third lens region C. All of the first lens region A, the second lens region B, and the third lens region C are adjacent to each other along the first direction DR1.

The lens unit fields LU are repeatedly arranged along the first direction DR1. For example, the first lens region A, the second lens region B, and the third lens region C are repeatedly arranged along the first direction DR1.

The lens electrodes LE include first lens electrodes LE_A1~LE_A4, second lens electrodes LE_B1~LE_B4, and third lens electrodes LE_C1~LE_C8. The first lens electrodes LE_A1~LE_A4 may correspond to the first lens region A, the second lens electrodes LE_B1~LE_B4 may correspond to the second lens region B, and the third lens electrodes LE_C1~LE_C8 may correspond to the third lens region C.

Each of the first lens electrodes LE_A1~LE_A4, the second lens electrodes LE_B1~LE_B4, and the third lens electrodes LE_C1~LE_C8 may include a plurality of lens electrodes. Hereinafter, an example where the first lens electrodes LE~A1~LE_A4 are formed of 4 lens electrodes, the second lens electrodes LE_B1~LE_B4 are formed of 4 lens electrodes, and the third lens electrodes LE_C1~LE_C8 are formed of 8 lens electrodes will be described.

Referring to FIGS. 12 and 13, the common electrodes CE include a first common electrode CE1, a second common electrode CE2, and a third common electrode CE3. The first common electrode CE1 may correspond to the first lens region A, the second common electrode XE2 may correspond to the second lens region B, and the third common electrode CE3 may correspond to the third lens region C.

The first common electrode CE1, the second common electrode CE2, and the third common electrode CE3 may be isolated from each other, each having a pattern extending along the third direction DR3.

The first common electrode CE1, the second common electrode CE2, and the third common electrode CE3 may receive their respective voltages different from each other. The first common electrode CE1, the second common electrode CE2, and the third common electrode CE3 may be respectively connected to the bottom substrate 210 through shorting bars (not shown) and may receive voltages from the bottom substrate 210.

The lens unit field LU may have focusing points shifted by refractive index distributions of the first lens region A, the second lens region B, and the third lens region C. The focusing points of the lens unit field LU may be modified by frames.

Figure 14:
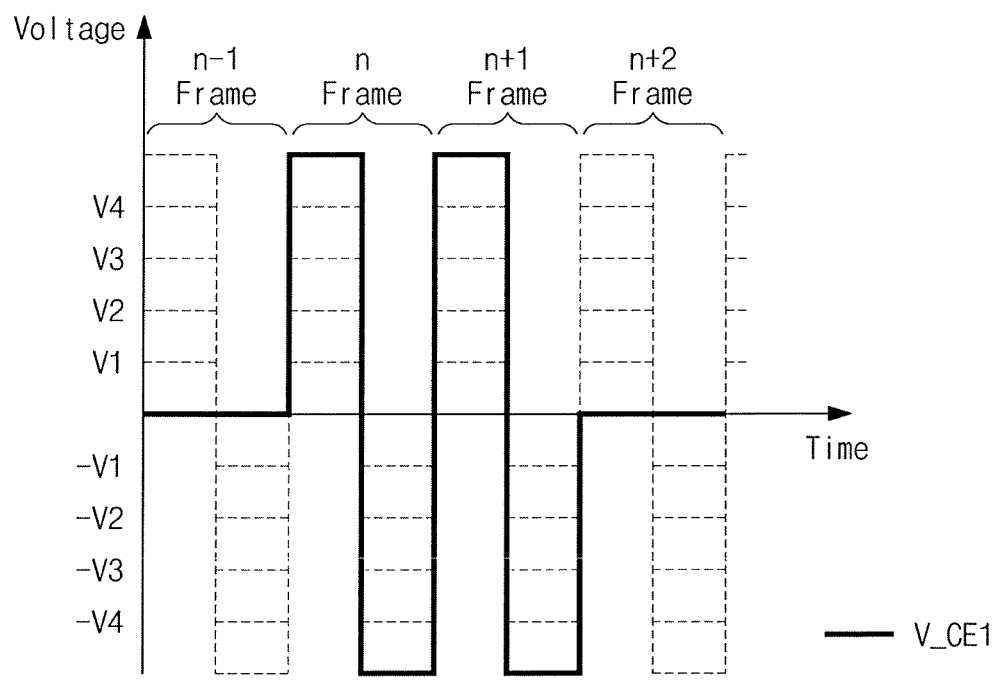
FIG. 14 shows voltages applied to first lens electrodes and a first common electrode corresponding to a first lens region according to an exemplary embodiment of the present inventive concept.
Figure 15:
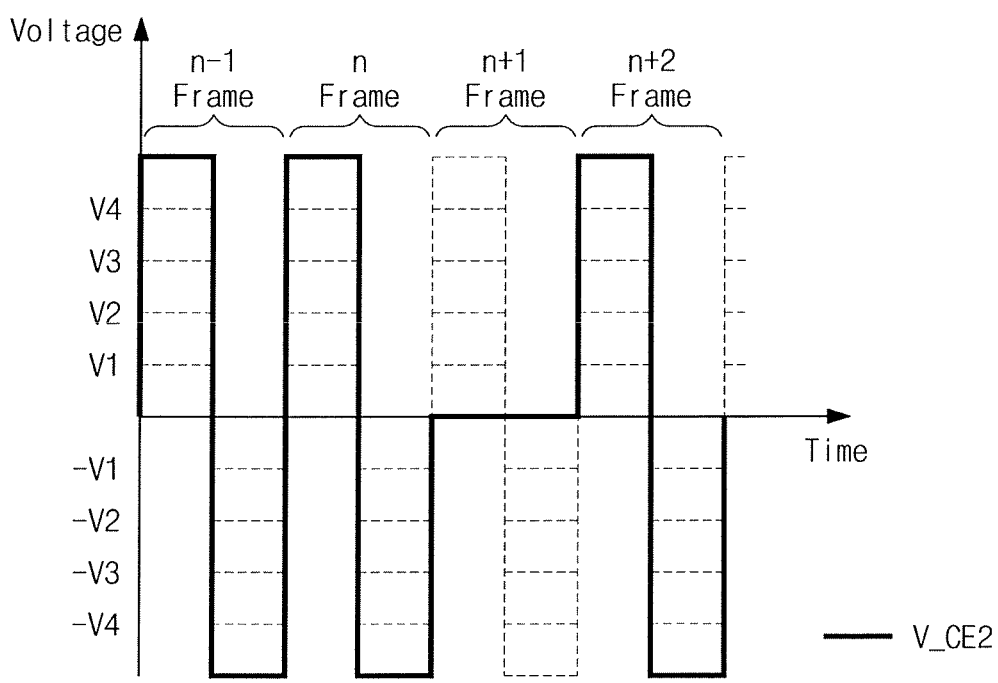
FIG. 15 shows voltages applied to second lens electrodes and a second common electrode corresponding to a second lens region according to an exemplary embodiment of the present inventive concept.
Figure 16:
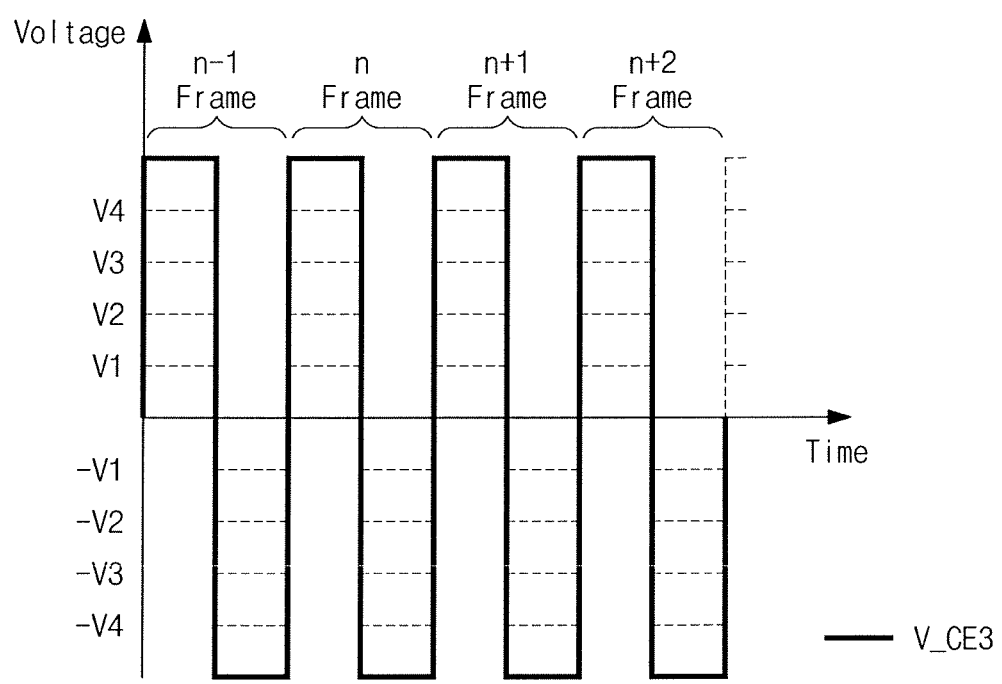
FIG. 16 shows voltages applied to third lens electrodes and a third common electrode corresponding to a third lens region according to an exemplary embodiment of the present inventive concept.

FIG. 14 shows voltages applied to the first lens electrodes LE$_{13}$ A1~LE_A4 and the first common electrode CE1 corresponding to the first lens region A according to an exemplary embodiment of the present inventive concept, FIG. 15 shows voltages applied to the second lens electrodes LE_B1~LE_B4 and the second common electrode CE2 corresponding to the second lens region B according to an exemplary embodiment of the present inventive concept, and FIG. 16 shows voltages applied to the third lens electrodes LE_C1~LE_C8 and a third common electrode CE3 corresponding to the third lens region C according to an exemplary embodiment of the present inventive concept.

Assuming that one of the first through fourth voltages V1~V4 is applied to each of the lens electrodes LE, the first through fourth voltages V1~V4 are set under the condition of $|V1|<|V2|<|V3|<|V4|$.

Referring to FIGS. 12, 14 through 16, the first lens electrodes LE_A1~LE_A4 may be supplied in the sequence of the fourth voltage V4, the third voltage V3, the second voltage V2, and the first voltage V1 (e.g., V4-V3-V2-V1). The second lens electrodes LE_B1~LE_B4 may be supplied in the sequence of the first voltage V1, the second voltage V2, the third voltage V3, and the fourth voltage V4 (e.g., V1-V2-V3-V4). The third lens electrodes LE_C1~LE_C8 may be supplied in the sequence of the first voltage V1, the second voltage V2, the third voltage V3, the fourth voltage V4, the fourth voltage V4, the third voltage V3, the second voltage V2, and the first voltage V1 (e.g., V1-V2-V3-V4-V4-V3-V2-V1).

An absolute voltage value applied to each of the lens electrodes LE may be constant for every frame. For example, the absolute voltage value applied to each of the lens electrodes LE may not be changed during n−1st, nth, n+1st, and n+2nd frames.

In addition, absolute voltage values applied to a common electrode CE may be different in two adjacent frames. For instance, referring to FIG. 14, an absolute value of a voltage V_CE1 applied to the first common electrode CE1 during the n−1st frame may be different from an absolute value of the voltage V__ CE1 applied to the first common electrode CE1 during the nth frame. In addition, referring to FIG. 15, an absolute value of a voltage V_CE2 applied to the second common electrode CE2 during the nth frame may be different from an absolute value of the voltage V_CE2 applied to the second common electrode CE2 during the n+1st frame. Thus, the focusing points of the lens unit field LU may be variable for every frame. Without restriction, absolute voltage values applied to a common electrode may be variable for every frame. For example, the focusing points of the lens unit field LU may be controlled by changing a common electrode in a unit of frame.

In addition, voltages applied to the common electrodes CE may be repeated for every frame period including a plurality of frames. The number of frames constituting the frame period may be the same as the number of common electrodes corresponding to a single lens region. Accordingly, the focusing points of the lens unit field LU may be identical for every frame period.

Hereinafter, an example in which the frame period includes three frames of the n−1st, nth, and n+1st frames will be described. The lens unit field LU may have 3 focusing points.

FIGS. 17A, 18A, and 19A show distribution profiles of refractive indices in the first through third lens regions A, B, and C, respectively during the n−1st, nth, and n+1st frames according to an exemplary embodiment of the present inventive concept, and FIGS. 17B, 18B and 19B show distribution profiles of refractive indices in the lens unit field LU formed of the first through third lens regions A, B and C, respectively during the n−1st, nth, and n+1st frames, according to an exemplary embodiment of the present inventive concept.

Referring to FIGS. 14 through 16, FIGS. 17A and 17B, the first lens region A, the second lens region B, and the third lens region C in order constitute one of the lens unit fields LU during the n−1st frame.

Referring to FIGS. 14 through 16, FIGS. 18A and 18B, the second lens region B, the third lens region C, and the first lens region A in order constitute one of the lens unit field LU during the nth frame.

Referring to FIGS. 14 through 16, FIGS. 19A and 19B, the third lens region C, the first lens region A, and the second lens region B in order constitute one of the lens unit field LU during the n+1st frame.

The refractive index distribution of the lens unit field LU during the n+2nd frame may be the same as the n−1st frame.

The focusing point of the lens unit field may be shifted by a ⅓ pitch of a pixel for every frame in the frame period. Without restriction, the focusing point of the lens unit field LU may be shifted by a 1/i pitch of a pixel for every frame in the frame period toward the first direction DR1 when the number of frame in the frame period is i, where i is a natural number more than 2.

Referring back to FIG. 14, the voltage V_CE1 applied to the first common electrode CE1 during the n−1st frame may be different from the voltage V_CE1 applied to the first common electrode CE1 during the nth frame or the n+1st frame. In addition, the voltage V_CE1 applied to the first common electrode CE1 during the nth frame may be the same as the voltage V_CE1 applied to the first common electrode CE1 during the n+1st frame.

Referring back to FIG. 15, the voltage V_CE2 applied to the second common electrode CE2 during the n+1st frame may be different from the voltage V_CE2 applied to the second common electrode CE2 during the n−1st frame or the nth frame. In addition, the voltage V_CE2 applied to the second common electrode CE2 during the n−1st frame may be the same as the voltage V_CE2 applied to the second common electrode CE2 during the nth frame.

Referring back to FIG. 16, during the n−1st, nth and n+1st frames, the voltages V_CE3 applied to the third common electrodes CE3 may be the same as each other.

FIG. 20 is a view illustrating images recognized by sight at the n−1st, nth, and n+1st frames according to an exemplary embodiment of the present inventive concept.

In FIG. 20, it is assumed that the display panel 100 shows nine view-points images, the images are refracted through the liquid crystal lens panel 200, and a user recognizes the nine view-points images.

First, the nine view-point images are displayed over nine pixels PX.

The liquid crystal lens panel 200 has the lens unit field LU1 during the n−1st frame and the user may recognize by sight the 1st through 9th view-point images 1C~9C through the lens unit field LU1.

During the nth frame, the liquid crystal panel 200 has the lens unit field LU2. A focusing point of the lens unit field LU2 of the liquid crystal lens panel 200 is shifted by a ⅓ pitch P of one pixel PX from a focusing point of the lens unit field LU1 during the n−1st frame along the first direction DR1. In addition, the user may recognize by sight the 10th through 18th view-point images 1B~9B. The 10th through 18th view-point images 1B~9B are shifted along the first direction DR1 by a ⅓ width W of one of the 1st through 9th view-point images 1A~9A through the lens unit field LU2.

In addition, during the n+1st frame, the liquid crystal lens panel 200 has the lens unit field LU3. A focusing point of the lens unit field LU3 of the liquid crystal lens panel 200 is shifted along the first direction DR1 by the ⅓ pitch P of one pixel PX from the focusing point of the lens unit field LU2 along the first direction DR1. The user may recognize the 19th through 27th view-point images 1C~9C through the lens unit field LU3. The 19th through 27th view-point images 1C~9C are shifted along the first direction DR1 by the ⅓ width W of one of the 10th through 18th view-point images 1B~9B.

Thus, the 3D display device according to an exemplary embodiment of the present inventive concept may display different view-point images depending on positions of the pixels PX, and may provides different view-point images depending on frames to a user. For example, in FIG. 20, the pixels PX express the 9 view-point images and the user may recognize by sight 27 view-point images in total through the liquid crystal lens panel 200 during the three frames (e.g., the n−1st frame, the nth frame, the n+1st frame). Therefore, the 3D display device according to an exemplary embodiment of the present inventive concept may have an increased number of view points for 3D images.

Figure 21:
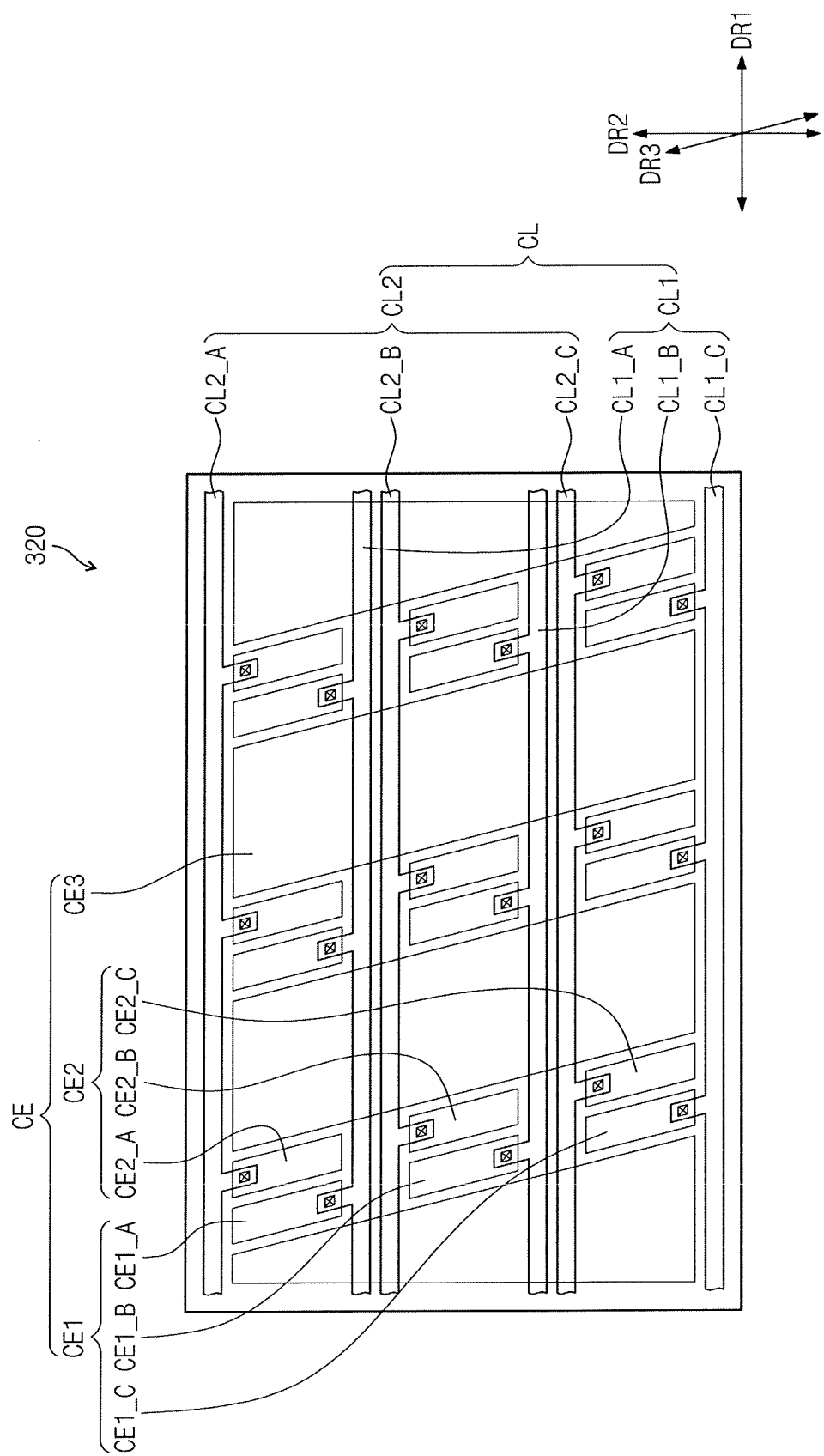
FIG. 21 is a plan view illustrating a top substrate of the liquid crystal lens panel of FIG. 12 according to an exemplary embodiment of the present inventive concept.

FIG. 21 is a plan view illustrating a top substrate of the liquid crystal lens panel 300 of FIG. 12 according to an exemplary embodiment of the present inventive concept.

Hereinafter, a difference between the top substrate shown in FIG. 21 and the top plate shown in FIG. 13 will be mainly described, but the not explained elements may correspond to those of FIG. 13.

Referring to FIGS. 12 and 21, the top substrate 320 includes a common electrode CE and a common line CL.

The common electrode CE includes a first common electrode CE1, a second common electrode CE2, and a third common electrode CE3. The first common electrode CE1 may correspond to the first lens region A, the second common electrode CE2 may correspond to the second lens region B, and the third common electrode CE3 may correspond to the third lens region C.

The third common electrodes CE3 may be isolated from each other along the first direction DR1, and extend along the third direction DR3. The third common electrodes CE3 may be lengthwise extended in the third direction DR3. The first common electrode CE1 and the second common electrode CE2 are isolated from each other along the first direction DR1 and the third direction DR3.

For example, referring to FIG. 21, the first common electrode CE1 includes a first row first common electrode CE1_A, a second row first common electrode CE1_B, and a third row first common electrode CE1_C, and the second common electrode CE2 includes a first row second common electrode CE2_A, a second row second common electrode CE2_B, and a third row second common electrode CE2_C. Without restriction, the first common electrode CE1 and the second common electrode CE2 may be formed of four and two members, respectively, along the third direction DR3.

Figure 22A:
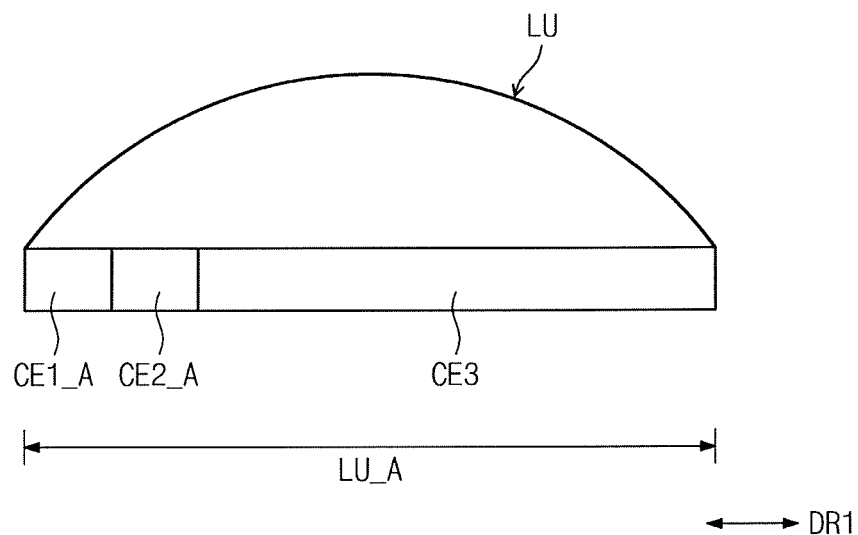
FIGS. 22A, 22B and 22C are views illustrating the first, second, and third row lens unit fields, respectively according to an exemplary embodiment of the present inventive concept.
Figure 22B:
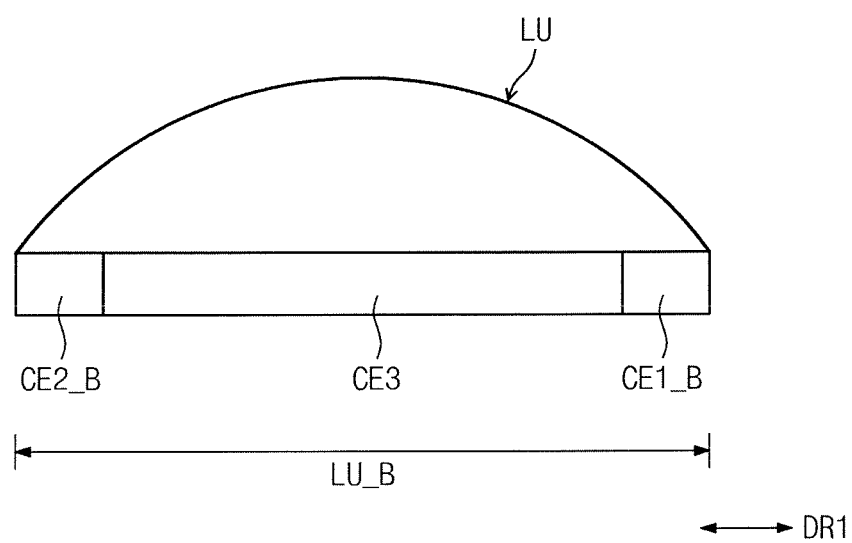
Figure 22C:
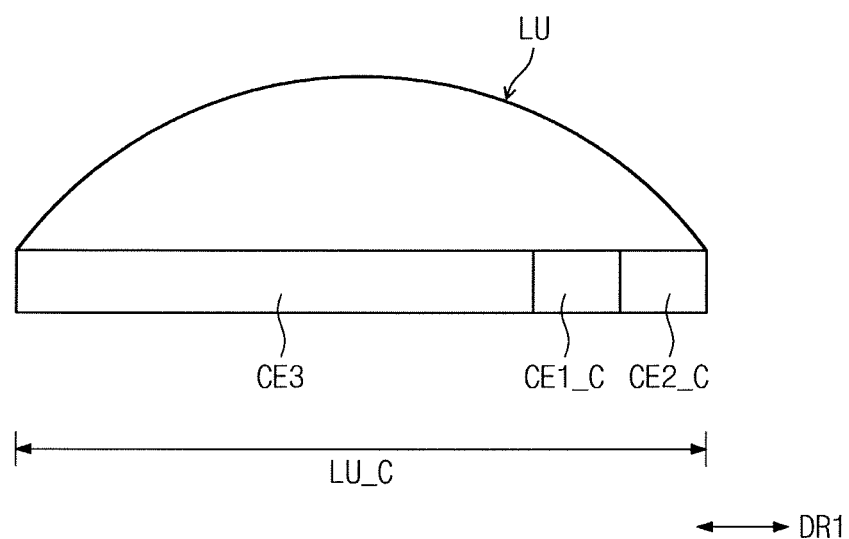

FIGS. 22A, 22B, and 22C are views illustrating first, second, and third row lens unit fields, respectively according to an exemplary embodiment of the present inventive concept.

Referring to FIGS. 12, 21, 22A through 22C, the lens unit fields LU may include the first row lens unit field LU_A, the second row lens unit field LU_B, and the third row lens unit field LU_C. All of the first row lens unit field LU_A, the second row lens unit field LU_B, and the third row lens unit field LU_C are adjacent to each other along the third direction DR3.

The first row first common electrode $CE1_{13}$ A, the first row second common electrode CE2_A, and the third common electrode CE3 may correspond to the first row lens unit field LU_A, the second row first common electrode CE1_B, the second row second common electrode CE2_B, and the third common electrode CE3 may correspond to the second row lens unit field LU_B, and the third row first common electrode CE1_C, the third row second common electrode CE2_C, and the third common electrode CE3 may correspond to the third row lens unit field LU_C.

The first row lens unit field LU_A, the second row lens unit field LU_B, and the third row lens unit field LU_C may be driven independently. The first row lens unit field LU_A, the second row lens unit field LU_B, and the third row lens unit field LU_C may have different focusing points from each other in the same frame. The focusing points may be shifted toward the first direction DR1 from the first row lens unit field LU_A to the third row lens unit field LU_C.

For example, the first row lens unit field LU_A is formed of the first row first common electrode CE1_A, the first row second common electrode CE2_A, and the third common electrode CE3 which are arranged in sequence. The second row lens unit field LU_B is formed of the second row second common electrode CE2_B, the third common electrode CE3, and the second row first common electrode CE1_B which are arranged in sequence. The third row lens unit field LU_C is formed of the third common electrode CE3, the third row first common electrode CE1_C, and the third row second common electrode CE2_C which are arranged in sequence.

The gate lines G1~Gk of the display panel 100 shown in FIG. 2 extend along the first direction DR1 and the gate lines G1~Gk are scanned in sequence along the second direction DR2. If an operating frequency of the display panel 100 is H Hz, an image for one frame is displayed for 1/H second and a delay of 1/(H×k) second is generated between pixels connected with two adjacent gate lines. If the common electrodes CE are connected in the third direction DR3, e.g., if the lens unit fields LU are not driven by being divided in the row direction, the liquid crystal lens panel 200 may not reduce a crosstalk that is caused from a delay of an image on the display panel 100. A black frame image may be displayed between adjacent frame images on the display panel 100 for suppressing the crosstalk. This may decrease a resolution of the display panel 100.

According to the 3D display device including the liquid crystal lens panel shown in FIG. 21, the first row through third lens unit fields LU_A, LU_B, and LU_C are divided in the third direction DR3 and driven independently and thus, the crosstalk due to the delay of an image may be reduced.

Referring back to FIG. 21, the common line CL includes a first common line CL1 and a second common line CL2.

The first common line CL1 may be connected with the first common electrode CE1 to which a voltage is supplied. The second common line CL1 is connected with the second common electrode CE2 to which a voltage is supplied. The first and second common lines CL1 and CL2 are each elongated along the first direction DR1. The first and second common lines CL1 and CL2 are isolated from each other in the second direction DR2.

A first common insulation film (not shown) including a first contact hole may be formed between the first common line CL1 and the first common electrode CE1. The first common line CL1 may be connected to the first common electrode CE1 through the first contact hole. In addition, a second common insulation film (not shown) including a second contact hole may be formed between the second common line CL2 and the second common electrode CE2. The second common line CL2 may be connected to the second common electrode CE2 through the second contact hole.

The first common line CL1 may include a first row first common line CL1_A, a second row first common line CL1_B, and a third row first common line CL1_C. The first row first common line CL1_A may be connected to the first row first common electrode CE1_A, the second row first common line CL1_B may be connected to the second row first common electrode CE1_B, and the third row first common line CL1_C may be connected to the third row first common electrode CE1_C.

The first row first common line CL1_A, the second row first common line CL1_B, and the third row first common line CL1_C may receive theeir voltages, respectively, for example, through the first row first common electrode CE1_A, the second row first common electrode CE1_B, and the third row first common electrode CE1_C. Therefore, the first row first common electrode CE1_A, the second row first common electrode CE1_B, and the third first common electrode CE1_C may receive different voltages from each other. The first row first common line CL1_A, the second row first common line CL1_B, and the third first common line CL1 _C may be connected, respectively to the bottom substrate 210 through a first shorting bar (not shown) and may receive voltages from the bottom substrate 210.

The second common line CL2 may include a first row second common line CL2_A, a second row second common line CL2_B, and a third row second common line CL2_C. The first row second common line CL2_A may be connected to the first row second common electrode CE2_A, the second row second common line CL2_B may be connected to the second row second common electrode CE2_B, and the third row second common line CL2_C may be connected to the third row second common electrode CE2_C.

The first row second common line CL2_A, the second row second common line CL2_B, and the third row second common line CL2_C may receive their voltages, respectively, for example, through the first row second common electrode CE2_A, the second row second common electrode CE2_B, and the third row second common electrode CE2_C. Therefore, the first row second common electrode CE2_A, the second row second common electrode CE2_B, and the third second common electrode CE2_C may receive different voltages from each other. The first row second common line CL2_A, the second row second common line CL2_B, and the third second common line CL2_C may be connected, respectively, to the bottom substrate 210 through a second shorting bar (not shown) and may receive voltages from the bottom substrate 210.

The first and second common lines CL1 and CL2 may be electrically insulated from the third common electrode CE3 and may overlap with the third common electrode CE3.

As described above, a 3D display device according to an exemplary embodiment of the present inventive concept may make a user to coincidently recognize 2D and 3D images by sight.

In addition, a 3D display device according to an exemplary embodiment of the present inventive concept may increase the number of different view points on a 3D image.

Although the present inventive concept has been described with reference to exemplary embodiments thereof, it will be apparent to those skilled in the art that various changes and modifications in form and detail may be made therein without departing from the spirit and scope of the present inventive concept as recited in the claims.

What is claimed is:

1. A three-dimensional (3D) display device comprising:
   a display panel extending along a first direction and a second direction substantially orthogonal to the first direction, wherein the display panel includes a plurality of pixels; and
   a liquid crystal lens panel disposed on the display panel, wherein the liquid crystal lens panel has a focusing point shifted for every frame,
   wherein the liquid crystal lens panel comprises:

a first lens unit field including first, second, and third lens regions which are adjacent to each other, wherein the first lens unit field has a Fresnel lens function;

a first substrate including a plurality of lens electrodes;

a second substrate opposite to the first substrate, wherein the second substrate includes a plurality of common electrodes; and a liquid crystal layer disposed between the first and second substrates, wherein absolute voltage values applied to each of the plurality of lens electrodes are constant for every frame.

2. The 3D display device of claim 1, wherein the first lens unit field comprises the first, second, and third lens regions adjacent to each other along the first direction, wherein the common electrodes comprises a first common electrode corresponding to the first lens region, a second common electrode corresponding to the second lens region, and a third common electrode corresponding to the third lens region.

3. The 3D display device of claim 2, wherein the first lens unit field comprises a first row lens unit field and a second row lens unit field which are adjacent to each other along the second direction, wherein the first common electrode comprises a first row first common electrode corresponding to the first row lens unit field and a second row first common electrode corresponding to the second row lens unit field, wherein the second common electrode comprises a first row second common electrode corresponding to the first row lens unit field and a second row second common electrode corresponding to the second row lens unit field.

4. The 3D display device of claim 3, wherein the first row lens unit field and the second row lens unit field have different focusing points in the same frame.

5. The 3D display device of claim 3, wherein the liquid crystal lens panel further comprises a common line connected to the common electrodes, wherein the common line comprises:

a first common line extending along the first direction and configured to supply a voltage to the first common electrode; and a second common line isolated from the first common line in the second direction, extending along the first direction, and configured to supply a voltage to the second common electrode.

6. The 3D display device of claim 5, wherein each of the first and second common lines receives a voltage from the first substrate.

7. The 3D display device of claim 1, wherein voltages applied to the common electrodes are repeated every frame period that includes a plurality of frames.

8. The 3D display device of claim 7, wherein the frame period comprises three through i-th frames, where i is a natural number, and a focusing point of the first lens unit field is shifted by 1/i of one pixel for every frame along the first direction.

9. The 3D display device of claim 8, wherein the frame period comprises first, second, and third frames which are adjacent to each other;

wherein, during the first frame, the first, second, and third lens regions are arranged in order in the first lens unit field, wherein, during the second frame, the second, third, and first lens regions are arranged in order in the first lens unit field, and wherein, during the third frame, the third, first, and second lens regions are arranged in order in the first lens unit field.

10. The 3D display device of claim 9, wherein an absolute voltage value applied to the first common electrode during the first frame is different from an absolute voltage value applied to the first common electrode during the second frame.

11. A three-dimensional (3D) display device comprising:

a display panel; and a liquid crystal lens panel disposed on the display panel, wherein the liquid crystal lens panel has a focusing point shifted for every frame, wherein the liquid crystal lens panel comprises:

a first lens unit field including first, second, and third lens regions;

a first substrate including a plurality of lens electrodes;

a second substrate opposite to the first substrate, wherein the second substrate includes a plurality of common electrodes; and a liquid crystal layer disposed between the first and second substrates, wherein absolute voltage values applied to each of the plurality of lens electrodes are constant for every frame, and absolute voltage values applied to one of the plurality of common electrodes are different in two adjacent frames.

* * * * *